US006181752B1

(12) United States Patent
Kim

(10) Patent No.: US 6,181,752 B1
(45) Date of Patent: *Jan. 30, 2001

(54) DEVICE AND METHOD FOR DETECTING PCM UPSTREAM DIGITAL IMPAIRMENTS IN A COMMUNICATION NETWORK

(75) Inventor: Dae-young Kim, Lexington, MA (US)

(73) Assignee: Motorola Inc., Schaumburg, IL (US)

( * ) Notice: Under 35 U.S.C. 154(b), the term of this patent shall be extended for 0 days.

This patent is subject to a terminal disclaimer.

(21) Appl. No.: 08/999,416

(22) Filed: Dec. 29, 1997

(51) Int. Cl.[7] .................................. H04B 1/10; H04J 3/12
(52) U.S. Cl. ............................. 375/346; 370/253
(58) Field of Search ........................ 375/346, 242, 375/246, 254, 295, 222, 298; 341/50, 56, 108, 110, 116, 126, 144, 155, 173; 370/253

(56) References Cited

U.S. PATENT DOCUMENTS

| 5,388,124 | * | 2/1995 | Laroia et al. ............... 375/286 |
| 5,394,437 | | 2/1995 | Ayanoglu et al. ............ 375/222 |
| 5,528,625 | | 6/1996 | Ayanoglu et al. ............ 375/222 |
| 5,546,395 | * | 8/1996 | Sharma et al. ............... 370/468 |
| 5,784,405 | * | 7/1998 | Betts et al. ................... 375/222 |
| 5,875,229 | * | 2/1999 | Eyuboglu et al. ............. 379/1 |

FOREIGN PATENT DOCUMENTS

PCT/FR 01657 10/1997 (FR) .

OTHER PUBLICATIONS

Dagdeviren, Nuri; Proposed Baseline For PCM Upstream Document Number: TT–30. Dec. 1996. Lucent Technologies; Midletown, NJ. Email: dagdeviren @ lucent.com. Dec. 4–5, 1996.

Demjanenko, Victor; Hirzel, Frederic; "Digital Attenuation Discovery." Telecommunications Industry Association, TechnicalCommittee TR30.1 PCM Modem Ad Hoc Group Meeting; VoCal Technologies, Ltd.; Apr. 1997. pp. 1–4, Attenuation Table pp. 1–2.

* cited by examiner

Primary Examiner—Chi H. Pham
Assistant Examiner—Khai Tran
(74) Attorney, Agent, or Firm—Joanne N. Pappas; Jeffrey T. Klayman

(57) ABSTRACT

A device and method for detecting digital impairments affecting an upstream pulse code modulation (PCM) channel in a digital communication network, involves: receiving, by a digital PCM modem interconnected to the digital communication network, a random sequence of digital values selected from a constellation of digital values transmitted over the upstream PCM channel of the digital communication network; establishing distributions of the received digital values, each distribution corresponding to one of a plurality of time intervals; and deriving from the distributions the types of robbed bit signaling and digital loss affecting the upstream PCM channel of the digital communication network for each time interval.

65 Claims, 13 Drawing Sheets

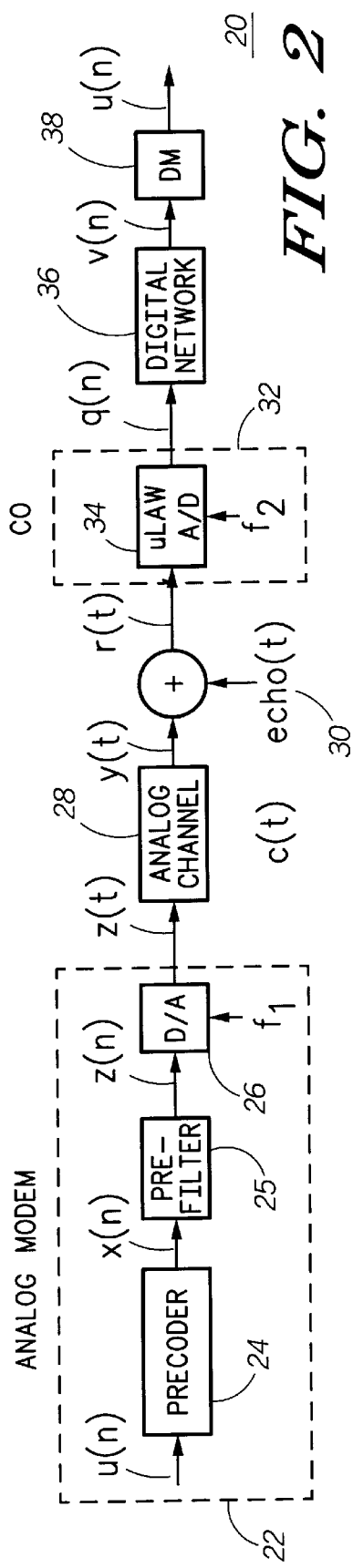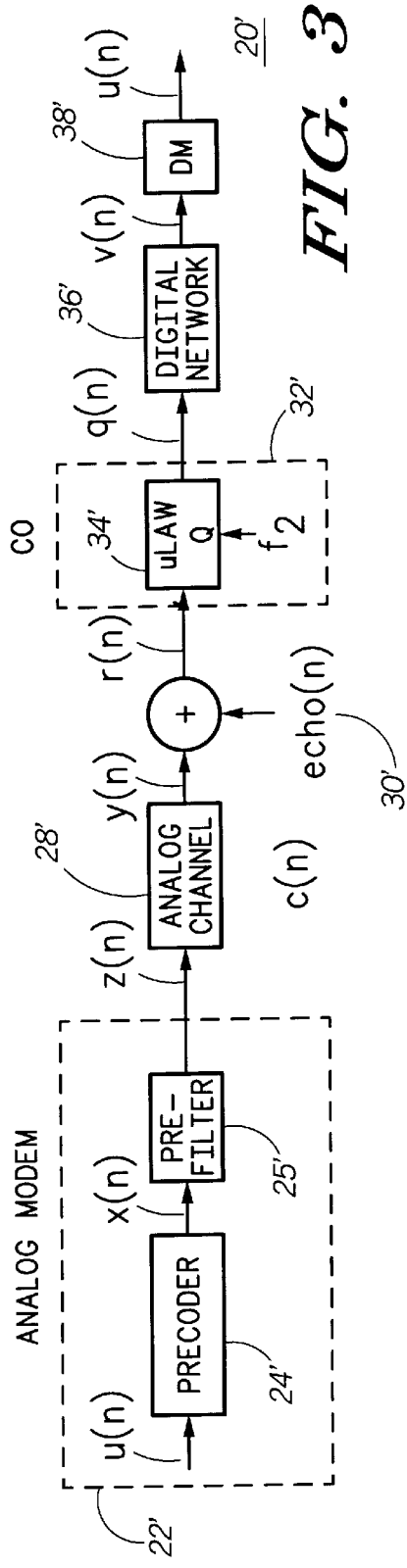

| V(n) | # OF OCCURRENCES |
|---|---|
| 0 | $X_0$ |
| 1 | 0 |
| 2 | $X_2$ |
| 3 | 0 |
| 4 | $X_4$ |
| ⋮ | ⋮ |
| 127 | 0 |

| V(n) | $q(n)_1$ | $q(n)_2$ |
|---|---|---|
| 0 | 0 | 1 |
| 1 | — | — |
| 2 | 2 | 3 |
| 3 | — | — |
| 4 | 4 | 5 |
| ⋮ | ⋮ | ⋮ |
| 126 | 126 | 127 |
| 127 | — | — |

| V(n) | q(n)$_1$ | q(n)$_2$ |
|---|---|---|
| 0 | 0 | — |
| 1 | 1 | — |
| 2 | 2 | — |
| 3 | 3 | — |
| 4 | 4 | — |
| • | • | • |
| • | • | • |
| • | • | • |
| 8 | 8 | — |
| 9 | 9 | — |
| • | • | • |
| • | • | • |
| • | • | • |
| 126 | 126 | — |
| 127 | 127 | — |

| V(n) | q(n)$_1$ | q(n)$_2$ |
|---|---|---|
| 0 | 0 | — |
| 1 | 1 | 2 |
| 2 | 3 | 4 |
| 3 | 5 | 6 |
| 4 | 7 | 8 |
| • | • | • |
| • | • | • |
| • | • | • |
| 8 | 15 | 16 |
| 9 | 17 | — |
| • | • | • |
| • | • | • |
| • | • | • |
| 110 | 126 | — |
| 111 | 127 | — |
| 112 | — | — |
| 113 | — | — |
| • | • | • |
| • | • | • |
| • | • | • |
| 126 | — | — |
| 127 | — | — |

DEVICE AND METHOD FOR DETECTING PCM UPSTREAM DIGITAL IMPAIRMENTS IN A COMMUNICATION NETWORK

FIELD OF THE INVENTION

This invention relates to a device and method for detecting PCM upstream digital impairments and using the detected impairments to estimate the analog channel characteristics and PCM downstream echo to improve PCM upstream transmission.

BACKGROUND OF INVENTION

Conventional modems, such as V.34 modems, treat the public switched telephone network (PSTN) as a pure analog channel even though the signals are digitized throughout most of the network. In contrast, pulse code modulation (PCM) modems take advantage of the fact that most of the network is digital and that typically central site modems, such as those of internet service providers and on-line services, are connected to the PSTN via digital connections (e.g., T1 in the United States and E1 in Europe). First generation PCM modems transmit data in PCM mode downstream only (i.e., from a central site digital modem to an analog end user modem) and transmit in analog mode, e.g., V.34 mode, upstream (i.e., from the end modem to the central site modem). Second generation PCM modems will also transmit data upstream in PCM mode.

With PCM downstream, the central site PCM modem transmits over a digital network eight bit digital words (octets) corresponding to different central office codec output levels. At the end user's central office, the octets are converted to analog levels which are transmitted over an analog loop. The end user's PCM modem then converts the analog levels into equalized digital levels. The equalized digital levels are ideally mapped back into the originally transmitted octets and the data the octets represent. With PCM upstream, the end user PCM modem transmits analog levels over the analog loop corresponding to the data to be transmitted and the levels are quantized to form octets by a codec in the end user's central office. The codec transmits the octets to the PCM central site modem over the digital network.

However, due to impairments in the digital network, such as digital trunk loss (in the U.S., typically 0, 3 or 6 dB) caused by digital padding and robbed bit signaling (hereinafter referred to as RBS), caused by the networks in-band signaling, the octets transmitted both in the upstream and downstream directions may be corrupted. If not accounted for, this can cause high data error rates in the modems.

Many modern digital networks which may carry PCM modem data are constructed as T-carrier systems that use robbed bit signaling. The digital data transmitted over these networks is grouped into octets (eight (8) bits) and the octets are grouped into frames (twenty four (24) octets). In FIG. 1 there is shown a frame 10 containing twenty four octets, $O_0$–$O_{23}$. The frames transmitted over the network are continuous, and the single 24 octet frame 10 is shown for descriptive convenience only. Certain octets are affected by RBS. The network uses the least significant bit (LSB) position of the affected octets to carry data to perform control functions in the network. Thus, for example, the first octet, $O_0$, may be affected by a type of RBS that forces the LSB of that octet to one, odd RBS, as indicated by the "F" in that octet. (The designation "NC" means "no change"). Depending on the octet of data carried in that interval, RBS may change that octet's data. In particular, if that octet had a zero in its LSB, RBS alters that octet. If, however, that octet had a one in its LSB, RBS would have no affect on the octet from the end-user's perspective.

It has been observed that RBS has deterministic periodicity with periods of six or twenty four octets. In this example, the RBS period is twenty four. Since RBS recurs every twenty four octets, the octets can be viewed as appearing in a basic period 12 of twenty four time slots or intervals, 0–23, which may or may not be affected by RBS. For example, octet $O_0$ appears in slot "0" which is affected by RBS, while octet $O_1$, for example, appears in slot "1" and is unaffected by RBS. It should be noted that due to the nature of the networks, it is possible to have more than one RBS affected interval in the basic period of twenty four, as evidenced by affected octet $O_6$.

Methods for detecting and mitigating downstream digital impairments are known. Examples of these methods are described in the following co-pending applications, assigned to the assignee of the present invention: U.S. patent application Ser. No. 08/885,710, Scull, Christopher J. T.; Burch, Richard A; *System, Device and Method for Detecting and Characterizing Impairments in a Communication Network;* filed Jun. 30, 1997; U.S. patent application Ser. No. 08/730, 433. Eyuboglu, M. Vedat; Barabell, Arthur J.; Humblet, Pierre A.; *System And Device For, And Method Of, Detecting, Characterizing, And Mitigating Deterministic Distortion In A Communications Network;* filed Oct. 15, 1996; U.S. patent application Ser. No. 08/979,994, Kim, Du-Young et al. entitled, *System, Device and Method for Detecting Impairments in a Communication Network,* filed Nov. 26, 1997; and U.S. patent application Ser. No. 08/979, 196 entitled, *Apparatus, System And Method For Transmitting And Receiving A Training Sequence Optimized For Detecting Impairments In A Communication Network,* filed Nov. 26, 1997. These applications are incorporated herein in their entireties.

With downstream transmission, the points transmitted over the digital network are known and this information is used for digital impairment detection according to the above referenced applications. However, with upstream transmission, before determining digital impairments, downstream PCM echo and the characteristics of the analog loop (channel), the points transmitted over the digital channel are unknown and the techniques for detecting digital impairments described in the above applications are not applicable to upstream transmission.

Therefore, a need exists for a device and method for detecting PCM upstream digital impairments to improve PCM upstream transmission. This information can also be used to estimate analog channel characteristics and PCM downstream echo to further improve PCM upstream transmission.

BRIEF DESCRIPTION OF THE DRAWINGS

FIG. 2 is a block diagram depicting PCM upstream transmission;

FIG. 3 is an equivalent discrete time block diagram of the block diagram of FIG. 2;

FIG. 5 is an example of an occurrence table according to this invention;

FIG. 6A is an example of an inverse digital-impairment table (IDT) according to this invention;

FIG. 6B is another example of an inverse digital-impairment table (IDT) according to this invention;

FIG. 6C is yet another example of an inverse digital-impairment table (IDT) according to this invention;

DETAILED DESCRIPTION OF A PREFERRED EMBODIMENT

Figure 1:
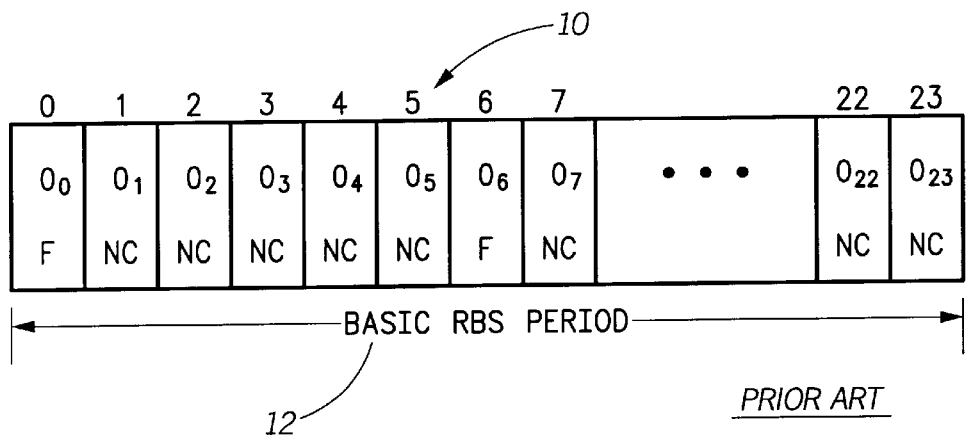
FIG. 1 is a chart of a frame of octets and how they may be affected by RBS.

Bi-directional PCM communication is described in U.S. application Ser. No. 08/724,491, entitled Hybrid Digital/Analog Communication Device, which is assigned to the assignee of the present invention and which is incorporated herein in its entirety by reference. In FIG. 2 there is shown block diagram 20, an example of PCM upstream transmission in such a bidirectional PCM communication system. There is included analog PCM modem 22, having a precoder 24, prefilter 25 and a digital to analog converter (D/A) 26, interconnected to analog channel 28. Precoder 24 receives digital data u(n) and outputs precoded data x(n). The precoded digital data is provided to prefilter 25 which outputs filtered signal z(n). Filtered signal z(n) is converted to analog form and is transmitted as signal, z(t), over analog channel 28, having a channel characteristic, c(t). The analog channel modifies the transmitted signal z(t) to form signal y(t) which then encounters downstream PCM echo, echo(t) 30, that is added to y(t), producing signal r(t). Signal r(t) is received by $\mu$-law (A-law in most countries outside of the U.S.) quantizer 34 in central office (CO) 32 and is quantized according to the $\mu$-law. See International Telecommunications Union, Recommendation G.711, Pulse Code Modulation (PCM) of Voice Frequencies, 1972.

The quantized octets (digital values), q(n), are transmitted over digital network 36 at a frequency of 8 kHz where they may be affected by various digital impairments, as discussed below. The possibly affected octets, v(n), are received by digital PCM modem 38 which ideally decodes the octets, v(n), into the original digital data, u(n).

Before data can be transmitted upstream, the clock ($f_1$) of D/A 26 in analog PCM modem 22 must be synchronized to the clock ($f_2$) of CO 32. This can be achieved by learning the clock from the downstream PCM signal (not shown) and synchronizing the clocks using the technique proposed in U.S. Pat. No. 5,199,046, entitled First and Second Digital Rate Converter Synchronization Device and Method, incorporated herein by reference in its entirety. Once the clocks are synchronized, PCM upstream block diagram 20, FIG. 2, can be represented as equivalent discrete time block diagram 20', FIG. 3, with like components being represented by the same reference numbers containing a prime ('). In block diagram 20' we assume that $f_1=f_2$; however, it must be noted that $f_1$ does not have to be equal to $f_2$ as long as the two clocks are synchronized. When $f_1$ is equal to $f_2$, n is the time index for 8 kHz samples, since the clock ($f_2$) of CO 32 is fixed at that frequency.

Precoder 24 (24') and prefilter 25 (25') may be implemented as described in co-pending application entitled Device and Method for Precoding Data Signals for Pulse Code Modulation (PCM) Transmission, CX096044P02, which is assigned to the assignee of the present invention and which is incorporated herein in its entirety by. As explained in co-pending application CX096044P02, digital data u(n) may be sent by transmitting z(n) such that the constellation points y(n) will be one of a number of points in an equivalence class for u(n). The point y(n) in the equivalence class of u(n) that is selected is usually determined to minimize the transmit power which is the power of x(n).

In a co-pending application entitled System, Device and Method for PCM Upstream Transmission Utilizing an Optimized Transmit Constellation, CX097028, which is assigned to the assignee of the present invention and which is incorporated herein in its entirety by reference, it is shown how to design the constellation for y(n) to decode y(n) (and eventually u(n)) from v(n) in the presence of echo, the $\mu$-law quantizer and digital impairments with a certain minimum error probability. This application also describes how digital PCM modem 38' decodes u(n) from v(n).

Figure 4:
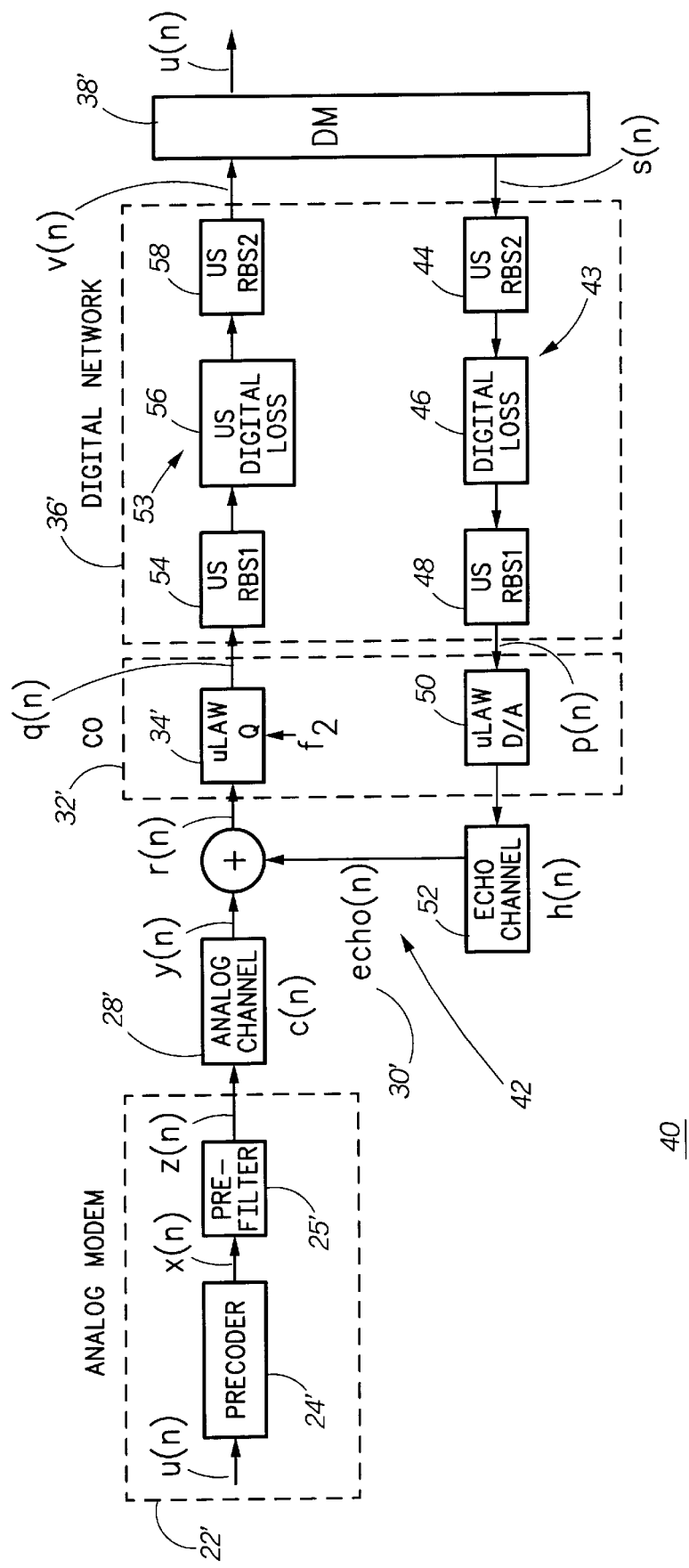
FIG. 4 is the equivalent discrete upstream block diagram of FIG. 3 including the echo path caused by downstream transmission.

Discrete time block diagram 40, FIG. 4, shows the equivalent discrete upstream block diagram 20' together with the echo path 42 caused by downstream transmission from digital PCM modem 38'. Digital PCM modem 38' transmits octets, s(n), downstream over digital network 36'. The octets s(n) may be affected by digital impairments, such as robbed bit signaling and digital loss in digital network 36', causing the octets s(n) to be modified.

In order to represent all possible combinations of digital impairments in the downstream channel 43 of digital network 36' there is shown a first occurrence of RBS, designated DS RBS1 44, which occurs before digital loss, designated DS digital loss 46, and a second occurrence of RBS, designated DS RBS2 48. The octets exiting digital network 36' are designated p(n). The possible types of DS RBS1 44 are no RBS, even RBS (LSB=0) and odd RBS (LSB=1). The possible types of DS RBS2 48 are no RBS, even RBS, odd RBS and midpoint reconstruction RBS.

As described above in the Background of Invention, RBS may vary according to time slot. In contrast, digital loss is not time varying, i.e. the digital loss is the same for all time slots. There are a number of possible digital losses that could affect downstream channel 43 of digital network 36', such as, 0.5 dB, 1 dB, 1.5 dB, 2 dB, 3 dB, 4 dB, 4.5 dB, 5 dB, 6 dB, 7 dB or 10.5 dB. See International Telecommunications Union, ITU-T, Recommendation G.121, Loudness Ratings (LRs) of National Systems, March, 1993). Also, downstream channel 43 of digital network 36' may be unaffected by digital loss, often referred to as 0 dB loss. The most common types are 3 dB and 6 dB loss and no digital loss (0 dB).

The detection of downstream digital impairments, i.e. DS RBS1 44, DS digital loss 46, DS RBS2 48, can be found in the co-pending patent applications referred to above.

The octets, p(n), exiting digital network 36' are received by μ-law digital to analog converter (D/A) 50 in CO 32' which outputs corresponding analog levels (μ-law levels) that are transmitted to analog PCM modem 22'. This portion of the downstream transmission is not depicted; however, the echo, echo (n) 30', produced by the downstream transmission, represented by echo channel 52 (with channel characteristic h(n)), is shown. The downstream PCM echo, echo (n) 30', is added to the output of the analog channel y(n) to form the signal r(n) which is input to μ-law quantizer 34' in central office (CO) 32'. As described above, the signal r(n) is quantized by μ-law quantizer 34' which outputs μ-law octets, q(n), over upstream channel 53 of digital network 36'.

In order to represent all possible combinations of digital impairments in upstream channel 53 of digital network 36' there is shown a first occurrence of RBS, designated US RBS1 54, which occurs before digital loss, designated US digital loss 56, and a second occurrence of RBS, designated US RBS2 58. The possible types of US RBS1 54 are no RBS, even RBS (LSB=0) and odd RBS (LSB=1). The possible types of US RBS2 58 are no RBS, even RBS, and odd RBS. Midpoint reconstruction RBS does not occur in the upstream channel. The possible types of US digital loss are the same as on the downstream channel. The most common types in the United States are 3 dB and 6 dB loss and no digital loss (0 dB) and this invention is described with regard to these losses. However, the principles of the invention may be readily applied to any level of digital loss.

The detection of upstream digital impairments, i.e., US RBS1 54, US digital loss 56, and US RBS2 58, according to this invention, is described first below. Then, the estimation of the analog channel, c(n), in the presence of these detected digital impairments and the estimation of the downstream PCM echo, echo (n), introduced into the upstream PCM transmission, and echo variance, $\sigma_e^2$, according to this invention, are described. The upstream digital impairments, the estimation of the analog channel, c(n), and echo variance are transmitted to analog PCM modem and may be used by that modem to select the appropriate transmit constellation, as described in co-pending patent application CX097028. The upstream digital impairments, the estimation of the analog channel, c(n), and the echo variance may alternatively be used by the digital PCM modem to improve decoding performance.

Digital Impairment Detection

Unlike downstream digital impairment detection, we do not have control over, or knowledge of, the precise input, octets q(n), to digital network 36', because the analog channel characteristic, c(n), is not initially known. This invention utilizes a random, reference directed training sequence, z(n), to detect digital impairments. A random training sequence, z(n), according to this invention, is one that produces signals y(n) with an essentially Gaussian distribution that excites most of the 256 μ-law points in μ-law quantizer 34' randomly. Because of loss in analog channel 28' some of the larger μ-law points may not be excited. The phase 2 line probing tone sequence specified in the ITU V.34 analog modem specification may be used, for example. The signal r(n) (or y(n) in the absence of echo (n) 30') will be quantized, q(n), by the μ-law quantizer 34'. The octets, q(n), pass through digital network 36' and digital modem 38' receives v(n), the digitally impaired version of q(n). Since the digital impairments are unknown, q(n) cannot be derived from v(n).

The basic idea of detecting upstream digital impairments by PCM digital modem 38', according to this invention, involves observing the distribution of received octets v(n) at each RBS time slot during the training sequence, or after it is completed, to determine the impairments, both RBS and digital loss, affecting the upstream PCM channel of the digital communication network during each RBS time slot. A preferred technique for detecting digital impairments according to this invention is described as follows.

First, a distribution of received octets v(n) for each RBS time slot is collected by, for example, establishing an occurrence table 60, FIG. 5, that maintains a count of the number of times each of the possible received octets 0–127 (the constellation of digital values) have been received in each RBS time slot. There are actually 256 possible μ-law octets, 0–255, that can be received, half are positive and the other half are negative with corresponding magnitudes. In the preferred embodiment, the received octets are converted to bit inverted octet (BIOS) form. That is, each bit of the received octet is inverted and all octets referred to herein are assumed to be in BIOS form unless otherwise specified. In BIOS form, μ-law octets 0–127 are positive octets and 128–255 are negative octets. Positive octet i, where I=0,1, . . . 127, and negative octet i have the same magnitude, but opposite signs.

In occurrence table 60, a count of the number of times each octet is received, regardless of its sign, is maintained to form a distribution of received octets v(n). Depending on the impairment condition affecting the digital network, certain μ-law octets will not be received. For example, in table 60, μ-law octets 1, 3 . . . and 127 have zero occurrences, meaning that digital modem 38' has not received these μ-law octets. The other μ-law octets shown, namely, 0, 2 . . . and 4 have been received $X_0$, $X_2$, $X_4$ . . . times, respectively.

When the training sequence is terminated, or preferably during the training sequence, the distributions of received octets v(n) are analyzed to determine the impairments affecting the upstream PCM channel of the digital communication network. As described above, the most common digital impairments are RBS1={0,1,NoRBS}, digital loss={0 dB, 3 dB,6 dB}, and RBS2={0,1,NoRBS} and each RBS time slot in a given digital network may be affected by any combination of these impairments. A combination of impairments may be referred to herein as an impairment condition. For each digital impairment condition, an inverse digital-impairment table (IDT) whose first column contains all possible octets v(n), 0–127, that may be received by digital modem 38' and the remaining columns are the possible q(n) octet(s) input to the digital network 36' that produce the received octets v(n) under the specified impairment condition of the table.

Table 70, FIG. 6A, is an example of an IDT table for the following impairment condition: RBS1=No RBS, digital loss=0 dB, RBS2=1. In this table, it can be observed that, for example, both μ-law octets q(n), and q(n)$_2$, 0 and 1, input to a digital network affected by the above impairment condition, will be mapped to a single received octet v(n), 0. As noted above, due to the impairment condition in the network, there are certain octets, v(n), that cannot be received, regardless of the μ-law octets input to the digital network. Thus, there are no q(n) entries in the IDT table corresponding to these octets, v(n). These nonexistent q(n) entries are referred to herein as null point entries or simply null points. In IDT table 70, there are null points associated with all of the odd received octets, v(n), 1, 3 . . . 127 because under the impairment condition associated with IDT table 70, these octets cannot be received. The reason for this is that the odd v(n) octets have a one in their least significant bit (LSB) position (in BIOS form) and since RBS2=1, the LSB of all received octets is forced to a zero (in BIOS form). This is true for all IDT tables with RBS2=1.

Table 80, FIG. 6B, is an example of an IDT table for the following impairment condition: RBS1=No RBS, digital loss=0 dB, RBS2=No RBS. Since there are no impairments associated with this table, it can be observed that there are no null points and, although they are not all shown, all q(n) octets input to a digital network with no impairments will produce the same octets at the output of the digital network.

Table 90, FIG. 6C, is an example of an IDT table for the following impairment condition: RBS1=No RBS, digital loss=6 dB, RBS2=No RBS. With this table, it can be observed that there are a number of received octets which are produced by two different μ-law octets $q(n)_1$ and $q(n)_2$. And, although they are not all shown, the only null points are associated with this table are the largest received octets, v(n), such as octets larger than 111. Sometimes, these large μ-law octets are not excited during the training sequence, especially when the analog channel has a significant loss. So, if the large μ-law octets in the occurrence table 60 have not been received it is unclear whether it is due to the fact that the large μ-law octets were not excited during the training sequence or that they were excited but the impairment condition associated with IDT table 90 affected the network in such a way to produce null points for these large μ-law octets.

The above described IDT tables are only exemplary and it will be apparent to one skilled in the art that an IDT table must be established for all expected impairment conditions. Moreover it will be apparent to one skilled in the art from the above description how to construct all necessary IDT tables. It should be noted that while the IDT tables shown in FIGS. 6A–C have at most two possible q(n) values for a received octet v(n), for certain impairment conditions there may be more than two possible q(n) values which produce a received octet v(n).

In order to simplify the description of impairment detection according to this invention, impairment detection will be described using a hypothetical, simplified digital network having only the following ten impairment conditions:

| RBS1 | Digital Loss | RBS2 |
|---|---|---|
| No RBS | 0dB | No RBS |
| No RBS | 0dB | 1 |
| No RBS | 3dB | No RBS |
| No RBS | 3dB | 1 |
| 1 | 3dB | No RBS |
| 1 | 3dB | 1 |
| No RBS | 6dB | No RBS |
| No RBS | 6dB | 1 |
| 1 | 6dB | No RBS |
| 1 | 6dB | 1 |

It will be apparent to one skilled in the art how to expand this example and apply the invention to all possible impairment conditions expected for a particular application.

Figure 7:
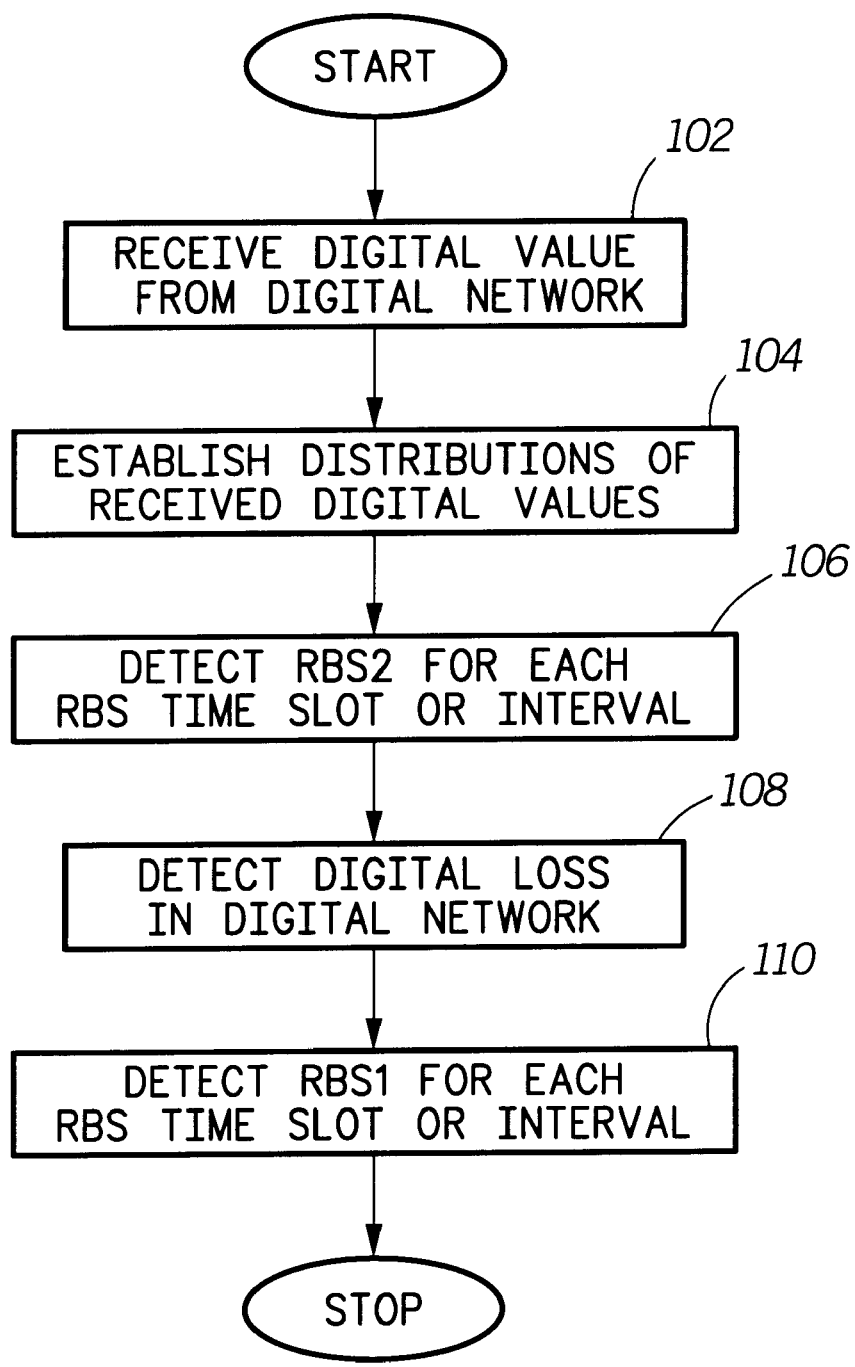
FIG. 7 is a flow diagram depicting upstream digital impairment detection according to this invention.

Digital impairment detection according to this invention is depicted in flow diagram 100, FIG. 7. In the preferred embodiment, it is assumed that RBS occurs in a period of 24 octets, as described in the Background of Invention. Therefore, RBS1 and RBS2 must be detected for each RBS time slot or interval, 0 through 23.

In step 102, the octets transmitted in the random training sequence are received from the digital network. As described above, impairment detection may be carried out during the training sequence or after it has terminated. In step 104, a distribution of the received octets is established for each RBS time slot, for example, by establishing an occurrence table as depicted in FIG. 5 and described above. Digital modem 38' begins the detection process preferably during the training sequence after a sufficient number of octets have been received. In step 106, RBS2 for each time slot is detected, as more fully described in FIG. 8.

Figure 8:
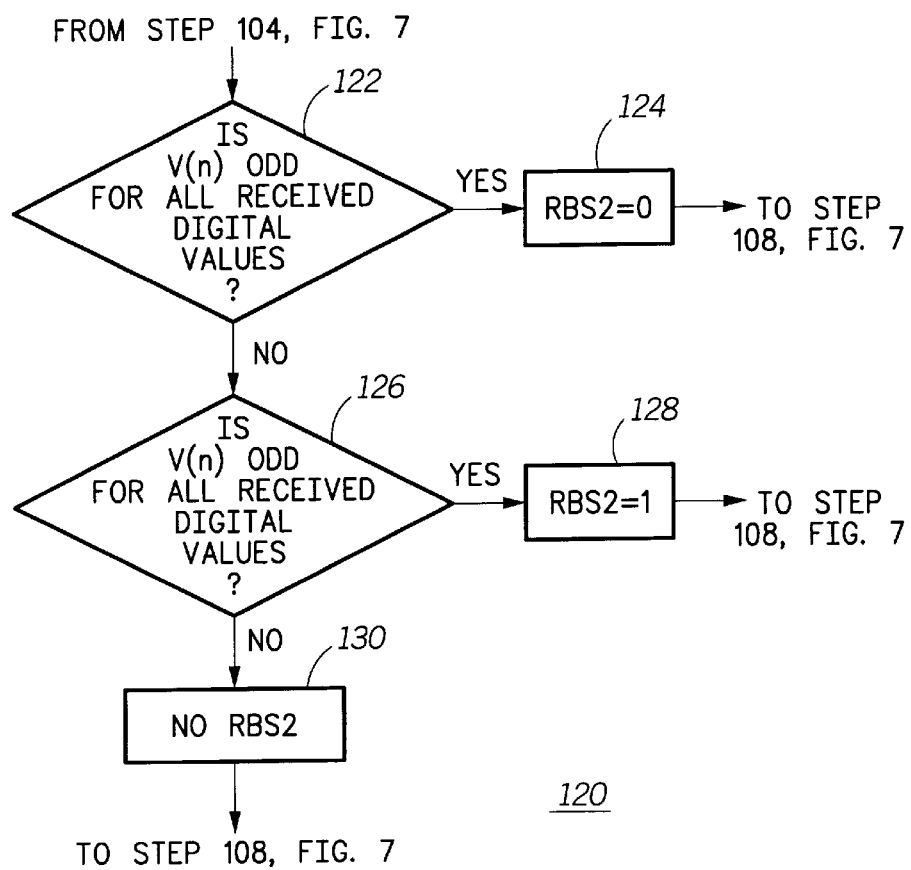
FIG. 8 is a flow diagram depicting RBS2 detection according to this invention.

Flow diagram 120, FIG. 8, depicts RBS2 detection according to this invention. In step 122, it is determined if all received octets, v(n), are odd, i.e. it is determined whether there have been no even v(n) octets received. If it is determined that all received octets, v(n), are odd, then in step 124 it is indicated that RBS2 is "0" or even RBS for that time slot. In the simplified example described above, RBS2 is never "0" or even RBS; however, detection of this type of RBS2 is described to generalize the description of RBS2 detection according to this invention. If in step 122 it is determined that all received octets, v(n), are not odd, then in step 126 it is determined if all received octets, v(n), are even, i.e. it is determined whether there have been no odd v(n) octets received, such as in IDT table 70, FIG. 6A. If all received octets, v(n), are even, then in step 128 it is indicated that RBS2 is "1" or odd RBS for that time slot. If in step 126 it is determined that all received octets, v(n), are not even, then in step 130 it is indicated that there is no RBS2 in the digital network for that time slot.

Figure 9:
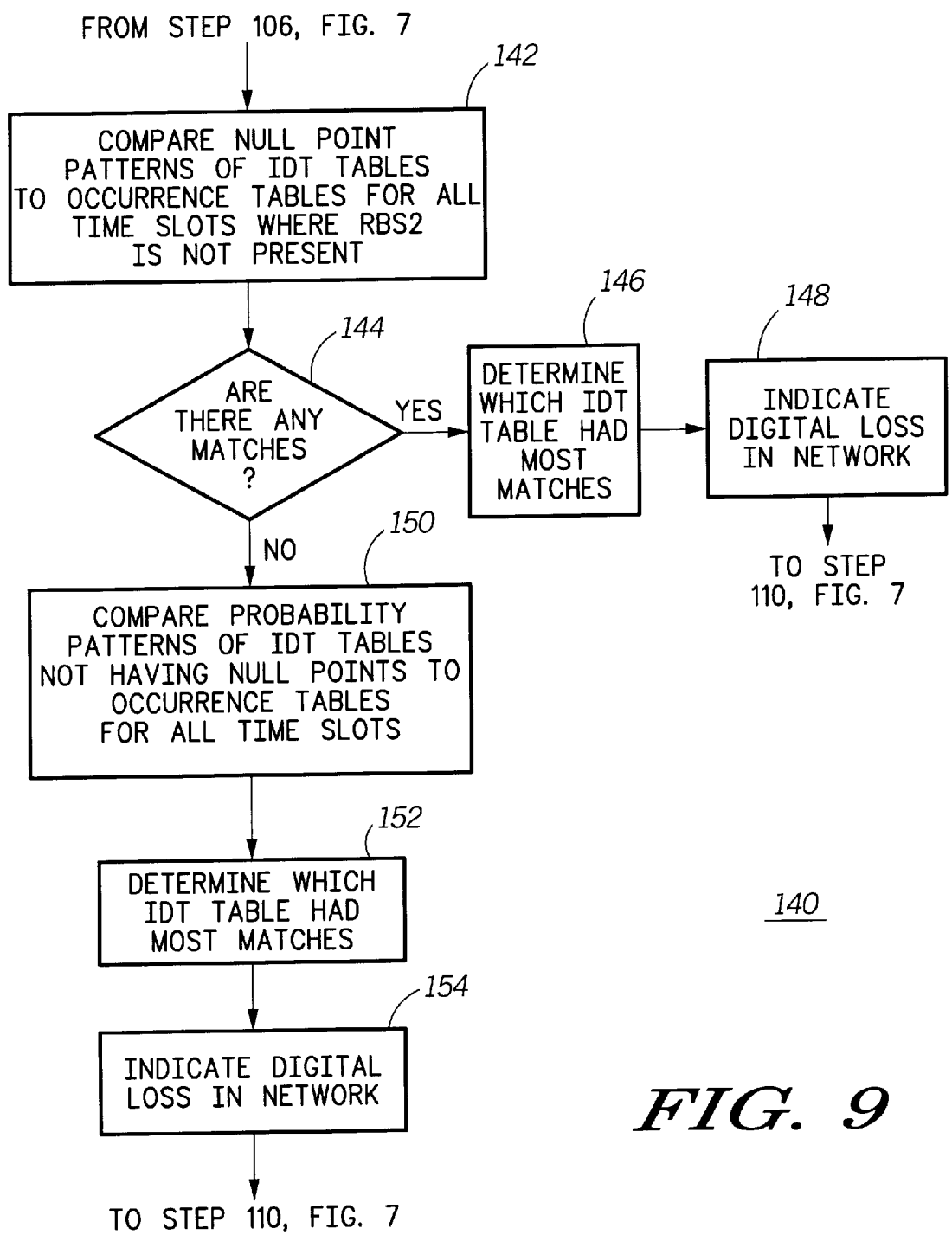
FIG. 9 is a flow diagram depicting digital loss detection according to this invention.

Referring again to FIG. 7, after RBS2 has been detected for each time slot, in step 108, digital loss in the network is detected, as more fully described in FIG. 9. Flow diagram 140, FIG. 9, depicts digital loss detection according to this invention. In step 142, the null point patterns (i.e. the locations of the null points) of all IDT tables having at least one null point (except IDT tables with only larger null points, e.g., table 90, FIG. 6C) and having no RBS2 are compared to the occurrence tables associated with the time slots not having RBS2. The IDT tables and time slots with no RBS2 are used in order to ensure more reliable digital loss detection. Also, since digital loss does not vary from time slot to time slot, the comparisons are made across time slots to ensure more accurate digital loss detection.

In the simplified example there are only five possible IDT tables with no RBS2 that must be compared to the occurrence table. They are the IDT tables having RBS2=No RBS and the following (i) RBS1=No RBS, 0 dB digital loss; (ii) RBS1=No RBS, 3 dB digital loss; (iii) RBS1=1, 3 dB digital loss; (iv) RBS1=No RBS, 6 dB digital loss; and (v) RBS1=1, 6 dB digital loss.

The IDT tables for (ii), (iii) and (v) have null point entries and therefore they will be compared to the occurrence tables. For example, with (v), i.e., RBS1=1, 6 dB loss, the IDT table (not shown) has null points when v(n) is 9,11,13,15,etc. The IDT tables for (i) and (iv) do not have any null points (except for several large μ-law octets in case of iv), therefore, these IDT tables are not compared to the occurrence tables.

In step 144, it is determined if there are any null point pattern matches between the IDT tables and the occurrence tables. For example, if an occurrence table for a particular time slot has zero occurrences at each of the null points of the IDT table for case (v), the digital loss in the network at that time slot will be determined to be 6 dB digital loss, the digital loss for case (v). In step 144, the null pattern of each of the possible IDT tables is compared to the occurrence tables associated with each of the time slots having no RBS2. In step 146, it is determined which IDT table had the most matches and in step 148 the type of digital loss associated with the IDT table having the most matches is indicated to be the type of digital loss present in the network for all time slots.

If it is determined in step 144 that there are no null point pattern matches between the IDT tables having null points and the occurrence tables, in step 150, probability patterns of all the IDT tables not having null points are compared to the occurrence tables for each time slot. In the simplified example, there are only two IDT tables not having null points, namely, the IDT tables of cases (i) and (iv) (except for several large $\mu$-law octets in case of iv). The probabilities of some entries of v(n) in the IDT tables are determined and compared to the occurrence tables to check for similar probability patterns.

The IDT tables 80, FIG. 6B, and 90, FIG. 6C are the IDT tables for cases (i) and (iv), respectively. In IDT table 80, case (i), for example, q(n)=8 (i.e. 13.0<r(n)$\leq$15.0) is mapped to v(n)=8, and q(n)=9 (i.e. 15.0<r(n)$\leq$17.0) is mapped to v(n)=9. Therefore, the probability to have v(n)=8 is almost the same as that of v(n)=9 (15.0−13.0/17.0−15.0=1.0, i.e., one to one). In contrast, in IDT table 90, case (iv), q(n)=15 and 16 (i.e. 29.0<r(n)$\leq$35.0) are mapped to v(n)=8, and q(n)=17 (i.e. 35.0<r(n)$\leq$39.0) is mapped to v(n)=9. Therefore, with case (iv), the probability to have v(n)=8 is approximately 1.5(35.0−29.0/39.0−35.0=6.0/4.0) times greater than that of v(n)=9 assuming that r(n) is uniformly distributed over 29.0<r(n)$\leq$39.0. It is not actually uniformly distributed, but rather it is a Gaussian distribution with a mean=0 and a variance=$\sigma_r$. Thus, the probability may be more accurately represented as:

$$Pr(29.0<r(n)<=35.0)/Pr(35.0<r(n)<=39.0)=Q\_fcn(35.0/\sigma_r)-Q\_fcn(29.0/\sigma_r)/Q\_fcn(39.0/\sigma_r)-Q\_fcn(35.0/\sigma_r) \quad (1)$$

For a description of Q_fcn see Shanmugan, K. S. and Breipohl, A. M., "Random Signals: Detection, Estimation and Data Analysis", John Wiley & Sons, Inc., 1988.

It can then be determined for each occurrence table which IDT table has a probability pattern that matches the occurrence table. That is, for a given occurrence table, using the above example, the ratio of occurrences of v(n)=8 to v(n)=9 is calculated and it is determined if it is a one to one ratio (IDT table 80, 0 dB digital loss) or if the ratio is 1.5 (IDT table 90, 6 dB digital loss). Other v(n) octets having similar properties may also be used.

In step 152, it is determined which IDT table had the most matches across time slots and in step 154 the digital loss associated with the IDT table having the most probability pattern matches is the indicated to be the type of digital loss present in the digital network.

Figure 10:
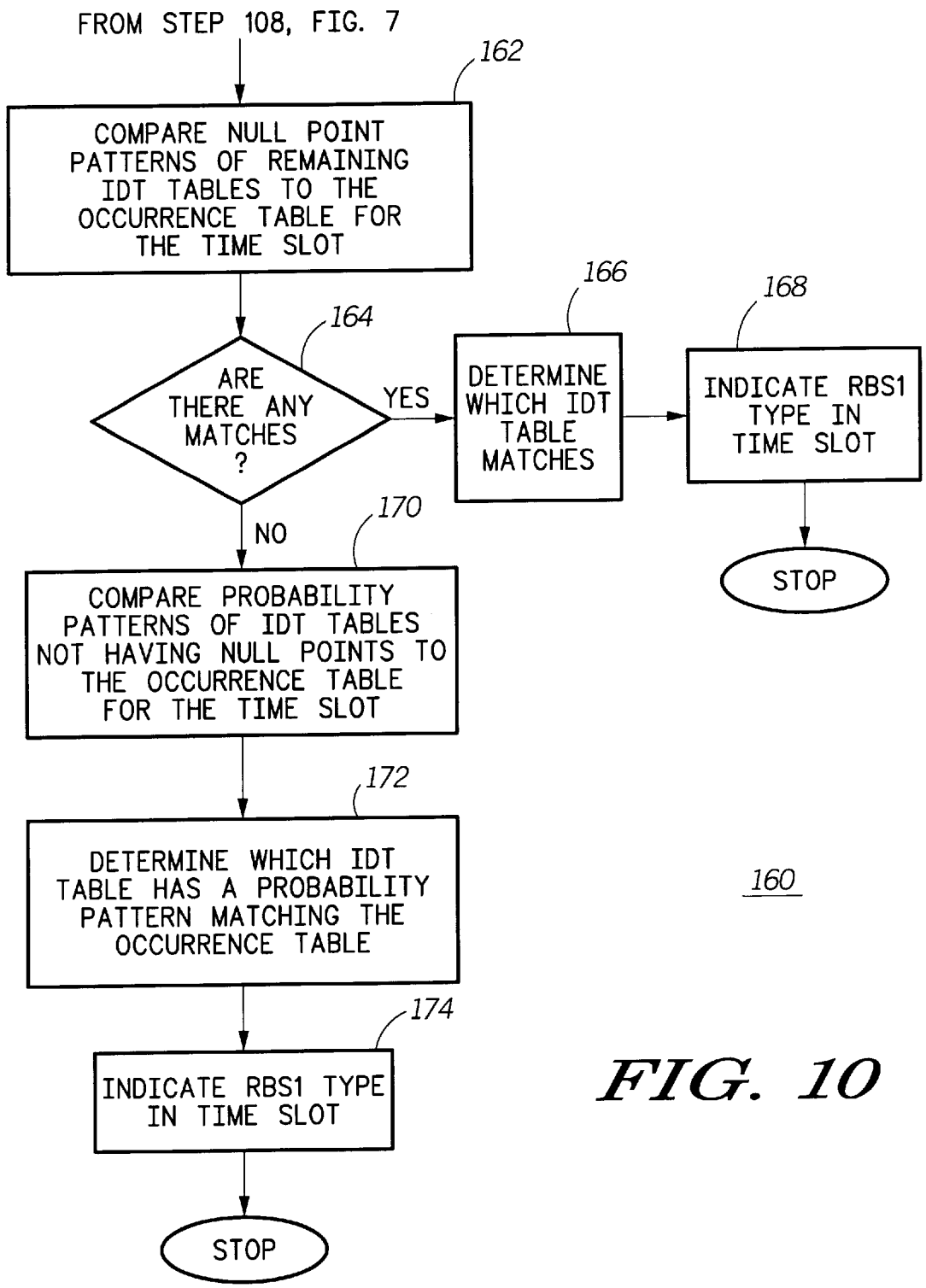
FIG. 10 is a flow diagram depicting RBS1 detection according to this invention.

Referring again to FIG. 7, RBS1 is detected in step 110. Once RBS2 and digital loss have been detected, using the simplified example, there are only two IDT tables remaining with impairments that may correspond to the impairment condition affecting the digital network. They are the tables having the detected RBS2 and digital loss and either RBS1=1 or No RBS. As shown in flow diagram 160, steps 162–174, FIG. 10, using these IDT tables, RBS1 can be detected for each time interval in a manner corresponding to the detection of digital loss described with regard to FIG. 9.

It should be noted that certain impairment conditions may be ruled out prior to performing any impairment detection as described above. For example, if large octets, such as octets greater in value or equal in value to 112, then the following impairment condition can be ruled out: RBS1=No, Digital loss=6 dB, and RBS2=No. This is because, as depicted in table 90, FIG. 6C, octets of this magnitude cannot be received with these types of impairments.

Analog Channel Estimation

Figure 11:
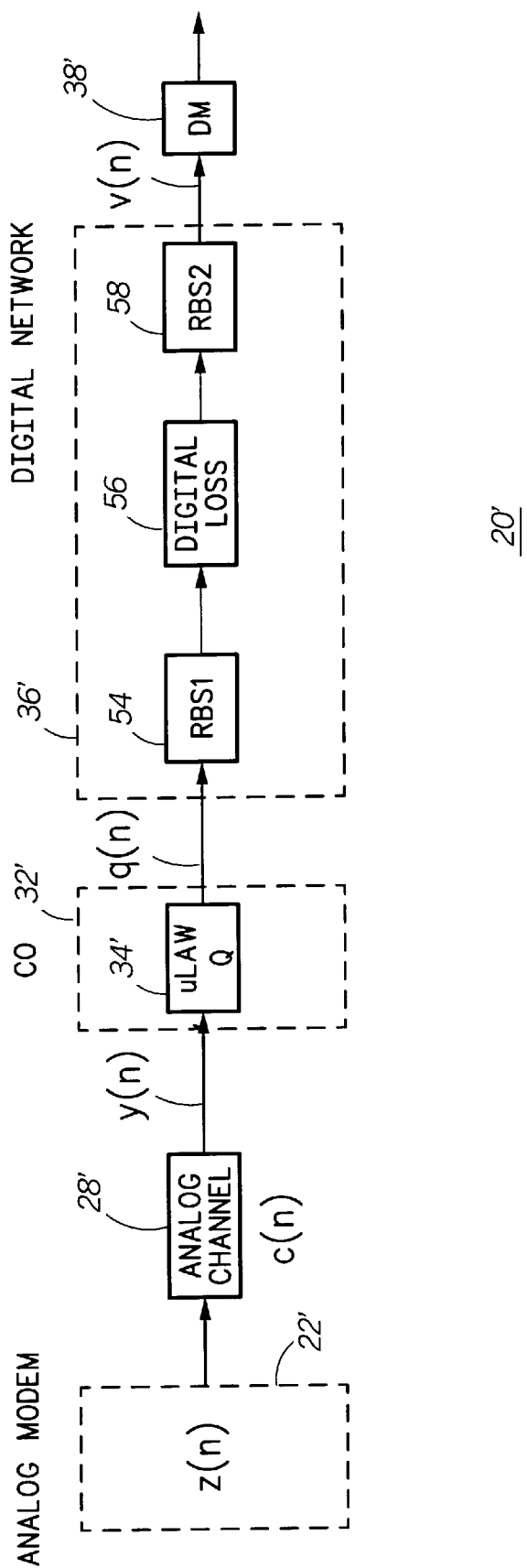
FIG. 11 is the equivalent discrete upstream block diagram of FIG. 3 in the absence of PCM downstream echo.

The analog channel, c(n), can be estimated taking into account the determined upstream digital impairments. To estimate the analog channel in the presence of digital impairments, PCM upstream transmission can be modeled as in FIG. 11. In FIG. 11, there is shown the upstream transmission block diagram 20' of FIG. 3 without PCM downstream echo. The analog channel, c(n), can be estimated in half duplex mode, i.e., when digital modem 38' does not transmit downstream and therefore there is no PCM downstream echo in the upstream transmission. Or, PCM upstream transmission can be modeled as in FIG. 4 and c(n) can be estimated in full duplex mode. The estimation of c(n) in half duplex mode will first be described. The estimation of c(n), together with the estimation of echo(n) in full duplex mode are described below with regard to FIG. 16.

Figure 12:
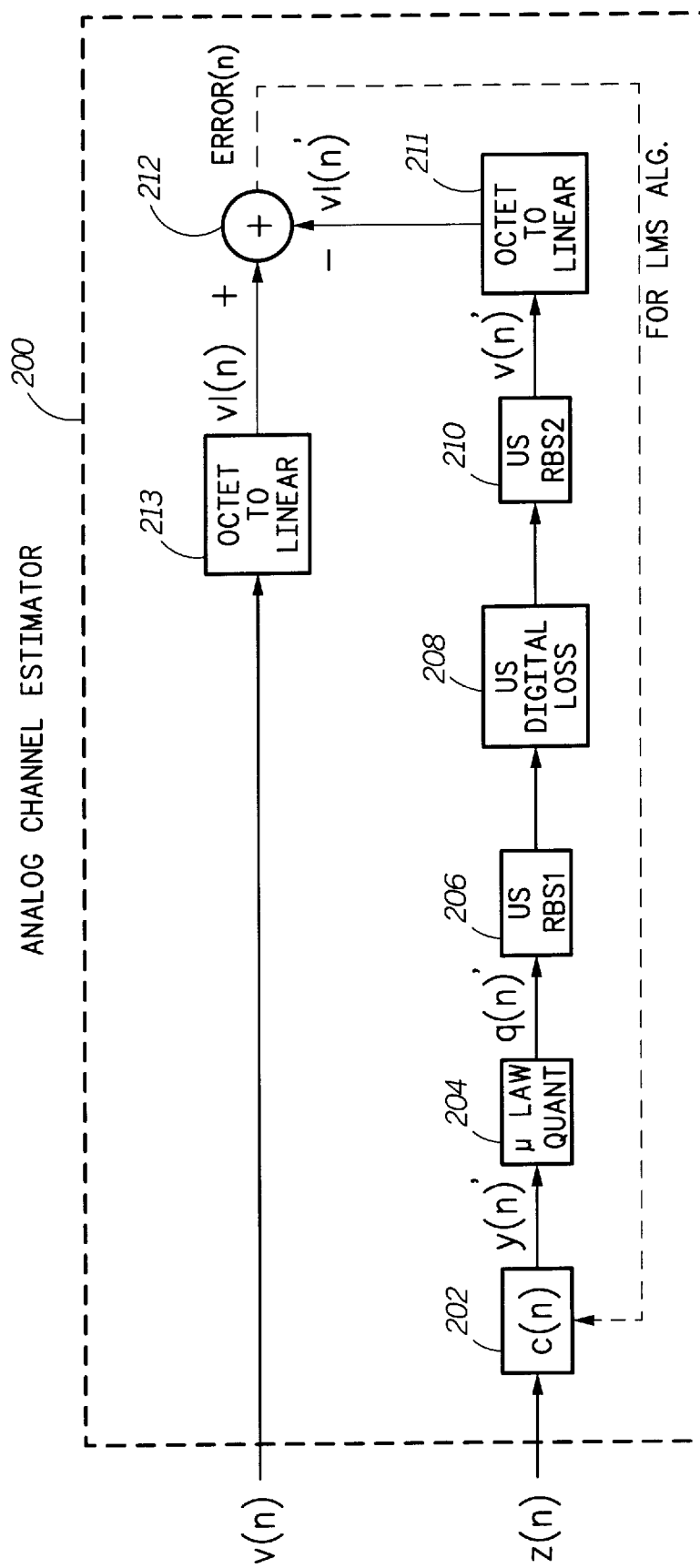
FIG. 12 is a block diagram of an analog channel estimator in accordance with this invention.

The analog channel estimator 200, FIG. 12, according to this invention, is implemented in digital modem 38'. Analog channel estimator 200 includes analog channel estimation block 202 which is implemented as an FIR filter and which receives as inputs the reference directed training sequence z(n) and an error signal, error(n), and outputs a signal y(n)', an estimation of y(n). Signal y(n)' is input to a $\mu$-law quantization block 204 which quantizes signal y(n)' to form signal q(n)'. The signal q(n)' is provided to US RBS1 block 206, US digital loss block 208 and US RBS2 block 210, which modify the signal according to the detected digital impairments to produce a signal v(n)', an estimation of received signal v(n). It should be noted that the types of RBS1 and RBS2 may vary according to time slot and before they are determined it assumed that they are not present.

Signal v(n)' is provided to octet to linear converter 211 which converts octets, v(n)' to linear values, vl(n)'. The linear values, vl(n)', are provided to adder 212. The actual received octets, v(n), are provided to octet to linear converter 213 which converts octets v(n) to linear values vl(n). The linear values vl(n) are also provided to adder 212 where the difference between vl(n) and vl(n)' is taken and provided as the error signal, error(n), to analog channel estimation block 202.

Analog channel estimation block 202, using the reference directed training sequence z(n), the error signal, error(n), and a least means square (LMS) algorithm, estimates the analog channel characteristic, c(n), as follows. The analog channel is represented as c(n) where n=0,1, . . . ,$N_c$−1, and where $N_c$ is the length of the channel, then the channel coefficients can be determined for i=0,1, . . . , $N_c$ as follows:

$$c_n(i)=c_{n-1}(i)+\nabla error(n)z(n-i) \quad (2)$$

where $c_n(i)$ represents the estimated channel coefficients at time n and $\nabla$ represents the LMS step size constant. For information on LMS algorithm see, e.g., B. Widrow and S. D. Sterns, "Adaptive Signal Processing", Prentice Hall, Inc., Englewood Cliffs, N.J. 1985.

Digital modem 38' then transmits the coefficients of the analog channel, c(n), to analog modem 22' which uses this information to improve upstream transmission, as described in co-pending application CX097028.

Downstream PCM Echo Estimation

Figure 13:
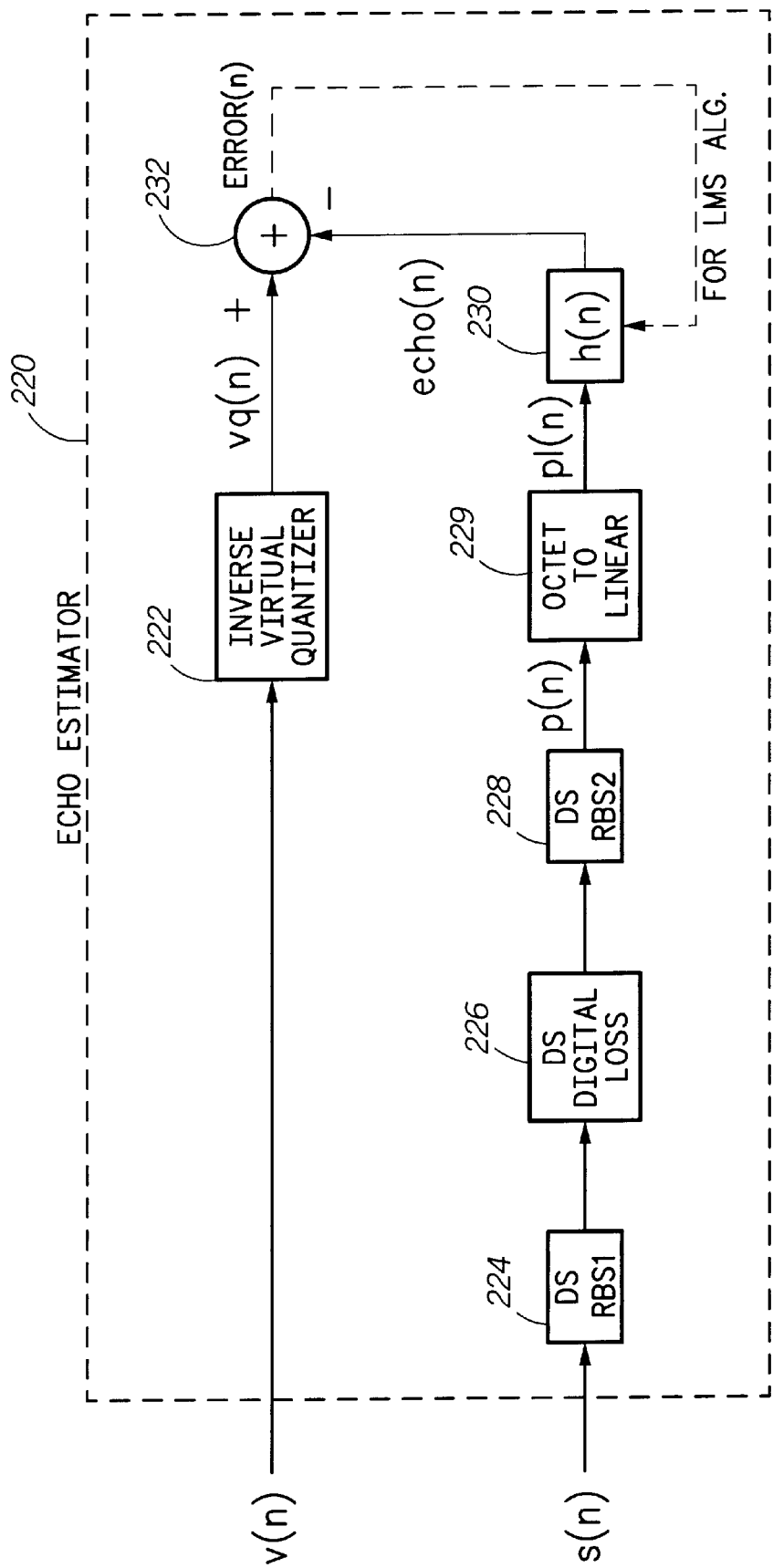
FIG. 13 is a block diagram of a PCM downstream echo estimator in accordance with this invention.

The PCM downstream echo, echo(n), can be estimated according to this invention by using echo estimator 220, FIG. 13, implemented within digital modem 38'. Echo estimator 220 takes into account both downstream and upstream digital impairments, as described below. The downstream echo, echo(n), being estimated is the echo introduced into the upstream transmission at the input of $\mu$-law quantizer 34', FIG. 4. By estimating the downstream echo at that location in the channel, instead of at the input to the digital modem, the non-linear effects of quantization and digital impairments are reduced and therefore a better estimation of the PCM downstream echo is obtained.

Figure 14:
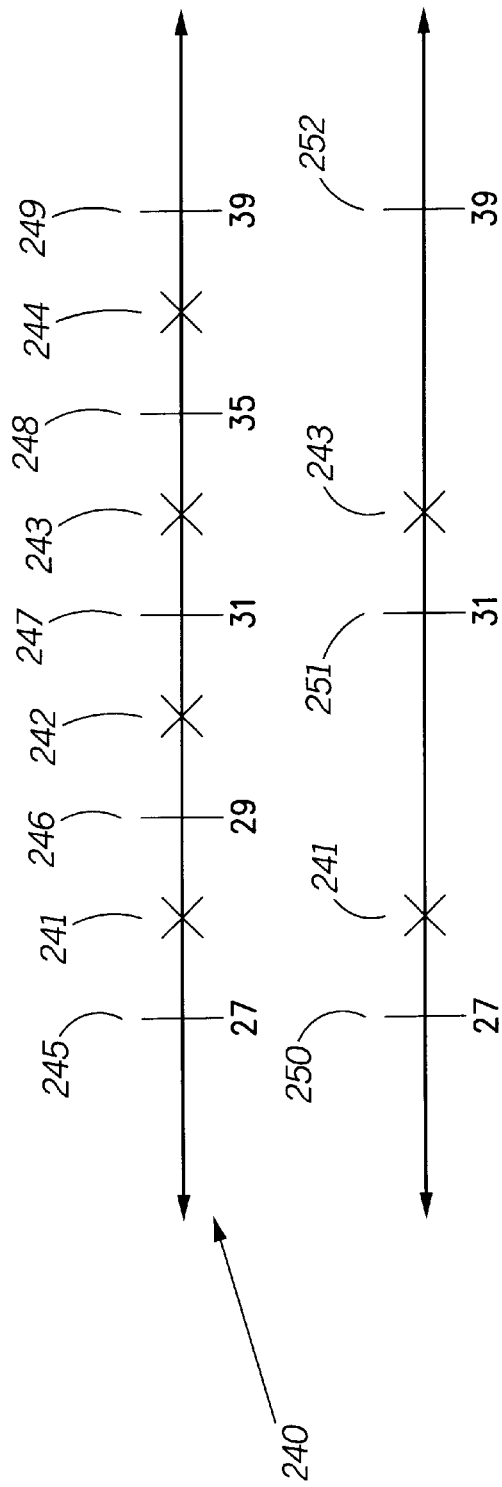
FIG. 14 depicts certain of the $\mu$-law quantizer thresholds and how the thresholds are altered in the presence of RBS.
Figure 15:
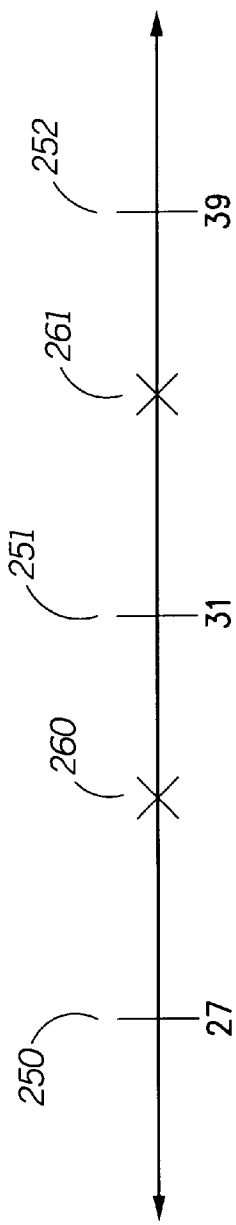
FIG. 15 depicts the altered $\mu$-law quantizer thresholds of FIG. 14 and the virtual quantizer points in accordance with this invention.

Echo estimator 220 includes an inverse virtual quantizer block 222 which receives signal v(n) and outputs virtual quantizer points, vq(n). The μ-law quantizer 34' and the detected upstream digital impairments are modeled as an equivalent new quantizer, inverse virtual quantizer 222, by setting equivalent quantizer thresholds as required given the detected impairments. An example of this is depicted in FIGS. 14 and 15. It should be noted that to estimate echo(n) most precisely the upstream portion of echo estimator 220 should be modeled as in FIG. 4 with the μ-law quantizer and the upstream impairment blocks, but since this is not feasible as q(n) is not known even though v(n) is given, inverse virtual quantizer 222 is used as the best alternative.

In FIG. 14 a portion of the original μ-law constellation 240 having points 241–244 and thresholds 245–249 is shown. Also shown in FIG. 14 is that same portion of the μ-law constellation with its thresholds modified to account for RBS1=1. Now there are fewer thresholds, 250–252, and because of this only two μ-law points, namely, 241 and 243, remain. With the new thresholds, 250–252, virtual quantizer points, vq(n)'s, e.g. 260 and 261, FIG. 15, can be established as the mid point between each pair of thresholds. It must be noted that these virtual quantizer points are no longer μ-law linear levels. Thus, inverse virtual quantizer 222, FIG. 13, is constructed to convert It-law octets, v(n), to their corresponding t virtual quantizer points, vq(n), based on the new thresholds and points selected as depicted in FIGS. 14 and 15.

Referring again to FIG. 13, echo estimator 220 also includes DS RBS1 block 224, which receives the downstream PCM signal, s(n). This signal also passes through DS digital loss block 226 and DS RBS2 block 228 which outputs a digitally impaired transmitted signal to octet to linear converter 229 which converts the octets p(n) to μ-law linear values pl(n). The μ-law linear values pl(n) are provided to echo channel block 230, which is implemented as an FIR filter. The digital impairment blocks are designed according to the digital impairments detected by analog modem 22'. The output of echo channel block 230 is the PCM downstream echo, echo(n), which is provided to adder 232. The virtual quantizer points, vq(n), are also supplied to adder 232 which takes the difference between vq(n) and echo(n) to form the error signal, error(n) that is fed back to echo channel block 230.

Echo channel block 230, using the digitally impaired signal, the error signal, error(n), and a least means square algorithm, estimates the PCM downstream echo, echo(n), by adapting h(n) as follows. Assume h(n), where n=0,1, . . . ,$N_n$-1, and where $N_n$ is the length of the echo channel, then the channel coefficients can be determined for i=0,1, . . . ,$N_n$-1 as follows:

$$h_n(i)=h_{n-1}(i)+\nabla \text{error}(n)pl(n-i) \quad (3)$$

where $h_n(i)$ represents the estimated channel coefficients at time n and $\nabla$ represents the LMS step constant.

From echo(n), the echo variance, $\sigma_e^2$, can be obtained by averaging the squared values of echo(n) over a predetermined time period, for example 1000 symbol times. Digital modem 38' then transmits to analog modem 22' the echo variance and the analog modem uses this information to improve upstream transmission as described in co-pending application CX097028 . Also, digital modem 38' uses the echo(n) estimation in the decoder also as described in co-pending application CX097028.

Combined Analog Channel and Downstream PCM Echo Estimation

Figure 16:
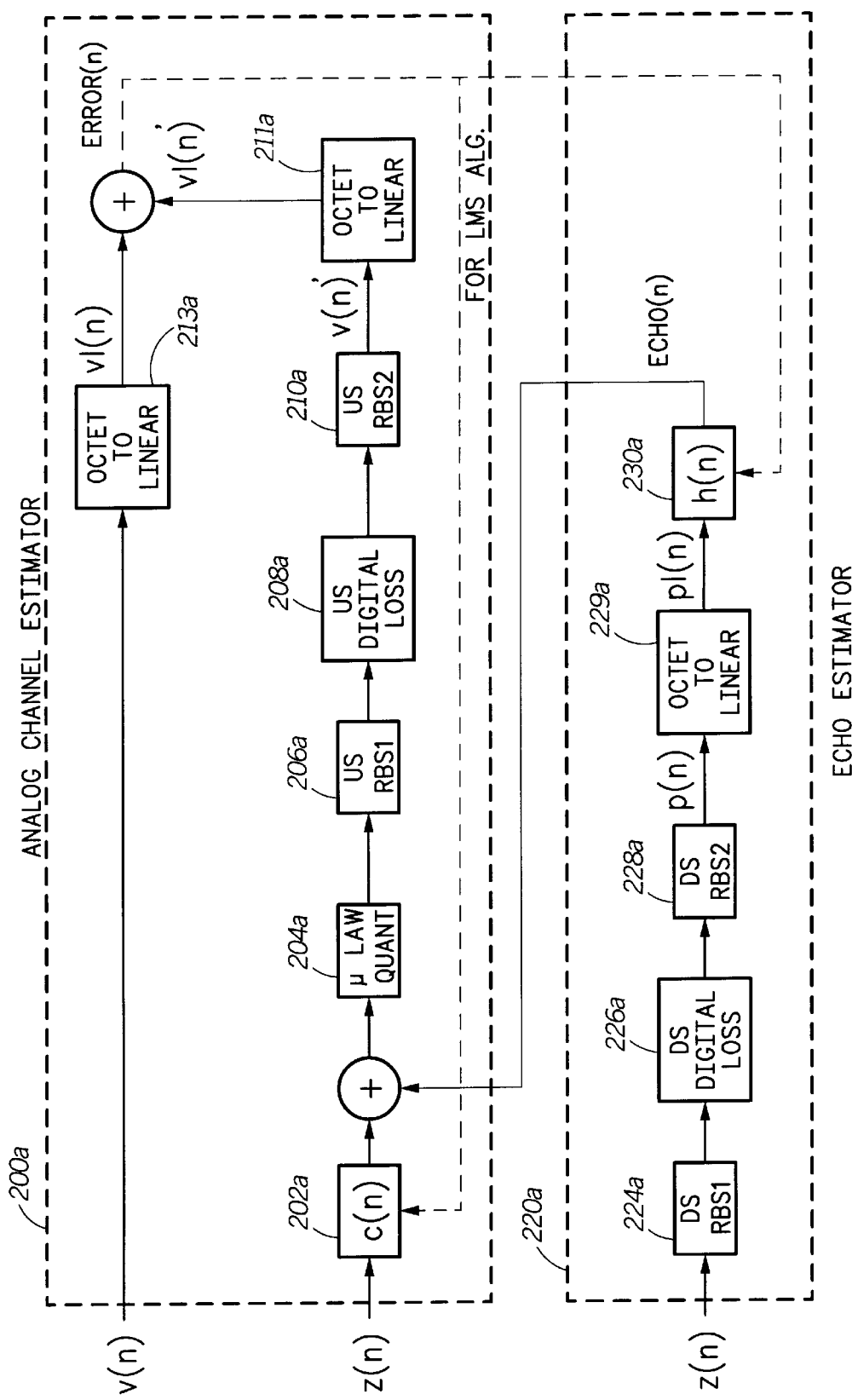
FIG. 16 is a block diagram of a full-duplex analog channel and PCM downstream echo estimator in accordance with this invention.

In FIG. 16, a full-duplex, combined analog channel and downstream echo estimator is depicted. Analog channel estimator 200a is configured the same as analog channel estimator 200, FIG. 12, except that there is a PCM downstream echo component, echo(n), estimated by echo estimator 220a, added to the output of analog channel estimation block 202a. Echo estimator 220a is configured the same as echo estimator 220, FIG. 13, except that there is no inverse virtual quantizer. Also, the estimators use a common error signal, error(n).

It should be noted that this invention may be embodied in software and/or firmware which may be stored on a computer useable medium, such as a computer disk or memory chip. The invention may also take the form of a computer data signal embodied in a carrier wave, such as when the invention is embodied in software/firmware which is electrically transmitted, for example, over the Internet.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range within the equivalency of the claims are to be embraced within their scope.

What is claimed is:

1. A method for detecting digital impairments affecting an upstream pulse code modulation (PCM) channel in a digital communication network, comprising:

receiving, by a digital PCM modem interconnected to the digital communication network, a random sequence of digital values selected from a constellation of digital values transmitted over the upstream PCM channel of the digital communication network;

establishing distributions of the received digital values, each distribution corresponding to one of a plurality of time intervals; and deriving from the distributions the types of robbed bit signaling and digital loss affecting the upstream PCM channel of the digital communication network for each time interval.

2. The method of claim 1 wherein the step of establishing includes establishing occurrence tables for the constellation of digital values from the received random sequence by maintaining a count of the number times each of the digital values in the constellation is received by the digital PCM modem during each time interval.

3. The method of claim 2 wherein there is a first occurrence of robbed bit signaling prior to the digital loss and a second occurrence of robbed bit signaling after the digital loss.

4. The method of claim 3 wherein the step of deriving includes observing the least significant bits of the received digital values in the distributions to determine the type of the second occurrence of robbed bit signaling in each time interval.

5. The method of claim 4 wherein the step of deriving further includes comparing a plurality of impairment tables, corresponding to different combinations of the first and second occurrences of robbed bit signaling and digital loss, to the occurrence tables to determine the type of digital loss affecting the upstream PCM channel of the digital communication network.

6. The method of claim 5 wherein the step of comparing includes comparing a pattern of each of the impairment tables to the occurrence tables.

7. The method of claim 6 wherein the step of comparing further includes determining which impairment tables have null points and comparing the null point patterns of the impairment tables having null points to the occurrence tables and determining if any of the null point patterns match the occurrence tables indicating the type of digital loss associated with the matching impairment table is the type of digital loss affecting the digital.

8. The method of claim 7 wherein the step of comparing further includes comparing, when no null point patterns match, the probability patterns of the impairment tables not having null points and determining which probability pattern matches the occurrence table indicating the type of digital loss associated with the matching impairment table is the type of digital loss affecting the digital network.

9. The method of claim 8 wherein the step of deriving further includes comparing a plurality of impairment tables, corresponding to different combinations of the first and second occurrences of robbed bit signaling and digital loss, to the occurrence tables to determine the type of the first occurrence of robbed bit signaling affecting the upstream PCM channel of the digital communication network for each time interval.

10. The method of claim 9 wherein the step of comparing includes comparing a pattern of each of the impairment tables to the occurrence tables.

11. The method of claim 10 wherein the step of comparing further includes determining which impairment tables have null points and comparing the null point patterns of the impairment tables having null points to the occurrence tables and determining if any of the null point patterns match the occurrence tables indicating the type of the first occurrence of robbed bit signaling associated with the matching impairment table is the type of the first occurrence of robbed bit signaling affecting the digital for each time interval.

12. The method of claim 11 wherein the step of comparing further includes comparing, when no null point patterns match, the probability patterns of the impairment tables not having null points and determining which probability pattern matches the occurrence table indicating the type of the first occurrence of robbed bit signaling associated with the matching impairment table is the type of the first occurrence of robbed bit signaling affecting the digital network for each time interval.

13. The method of claim 1 wherein the plurality of time intervals are robbed bit signaling time intervals.

14. The method of claim 2 wherein the step of deriving includes eliminating certain types of RBS and digital loss as being possible types affecting the digital communication network when there are received digital values that exceed a predetermined value.

15. In a digital pulse code modulation (PCM) modem interconnected to the digital communication network and adapted to receive data transmission from an analog PCM modem interconnected to an analog channel, a method for estimating the coefficients of the analog channel, comprising:

receiving, by the digital PCM modem, a sequence of octets, v(n), from the upstream PCM channel of the digital communication network, which octets are produced from a sequence of levels transmitted by the analog PCM modem over the analog channel and quantized;

determining from the received octets the digital impairments affecting the upstream PCM channel of the digital communication network;

converting the received octets to received linear values, vl(n);

receiving a reference directed sequence of the levels transmitted by the analog PCM modem;

filtering the reference directed sequence with an analog channel filter having analog channel coefficients to produce a filtered reference directed sequence;

quantizing the filtered reference directed sequence to produce a sequence of reference directed octets;

modifying the sequence of reference directed octets according to the determined upstream digital impairments to produce an estimated sequence of octets, v(n)', which is an estimation of the sequence of received octets, v(n);

converting the estimated sequence of octets, v(n)' to estimated linear values, vl(n)';

generating an error signal by taking the difference between the received linear values, vl(n), and the estimated linear values, vl(n)'; and estimating the analog channel coefficients using the error signal and the reference directed sequence of the levels.

16. In a digital pulse code modulation (PCM) modem interconnected to the digital communication network and adapted to receive upstream data transmission from an analog PCM modem interconnected to an analog channel, a method for estimating downstream echo introduced to the upstream data transmission at the input of a quantization device caused by downstream data transmission from the digital PCM modem to the analog PCM modem, the method comprising:

receiving, by the digital PCM modem, a sequence of octets, v(n), from the upstream PCM channel of the digital communication network, which octets are produced from a sequence of levels transmitted by the analog PCM modem over the analog channel and quantized by the quantization device;

determining from the received octets the digital impairments affecting the upstream PCM channel of the digital communication network;

converting the received octets, based on the quantization device and the determined upstream digital impairments, to virtual quantizer points, vq(n);

modifying octets transmitted downstream from the digital PCM modem according to predetermined downstream digital impairments to produce modified downstream octets, p(n);

converting the modified downstream octets to modified downstream linear values, pl(n);

filtering the modified downstream linear values, pl(n), with a downstream echo channel filter having echo channel coefficients to produce a downstream echo estimation;

generating an error signal by taking the difference between the virtual quantizer points, vq(n), and the estimated downstream echo; and updating the echo channel coefficients using the error signal and the modified downstream linear values, pl(n).

17. A device for detecting digital impairments affecting an upstream pulse code modulation (PCM) channel in a digital communication network, comprising:

logic for receiving, by a digital PCM modem interconnected to the digital communication network, a random sequence of digital values selected from a constellation of digital values transmitted over the upstream PCM channel of the digital communication network;

logic for establishing distributions of the received digital values, each distribution corresponding to one of a plurality of time intervals; and logic for deriving from the distributions the types of robbed bit signaling and digital loss affecting the upstream PCM channel of the digital communication network for each time interval.

18. The device of claim 17 wherein the logic for establishing includes logic for establishing occurrence tables for the constellation of digital values from the received random sequence by maintaining a count of the number times each of the digital values in the constellation is received by the digital PCM modem during each time interval.

19. The device of claim 18 wherein there is a first occurrence of robbed bit signaling prior to the digital loss and a second occurrence of robbed bit signaling after the digital loss.

20. The device of claim 19 wherein the logic for deriving includes logic for observing the least significant bits of the received digital values in the distributions to determine the type of the second occurrence of robbed bit signaling in each time interval.

21. The device of claim 20 wherein the logic for deriving further includes logic for comparing a plurality of impairment tables, corresponding to different combinations of the first and second occurrences of robbed bit signaling and digital loss, to the occurrence tables to determine the type of digital loss affecting the upstream PCM channel of the digital communication network.

22. The device of claim 21 wherein the logic for comparing includes logic for comparing a pattern of each of the impairment tables to the occurrence tables.

23. The device of claim 22 wherein the logic for comparing further includes logic for determining which impairment tables have null points and logic for comparing the null point patterns of the impairment tables having null points to the occurrence tables and determining if any of the null point patterns match the occurrence tables indicating the type of digital loss associated with the matching impairment table is the type of digital loss affecting the digital.

24. The device of claim 23 wherein the logic for comparing further includes logic for comparing, when no null point patterns match, the probability patterns of the impairment tables not having null points and logic for determining which probability pattern matches the occurrence table indicating the type of digital loss associated with the matching impairment table is the type of digital loss affecting the digital network.

25. The device of claim 24 wherein the logic for deriving further includes logic for comparing a plurality of impairment tables, corresponding to different combinations of the first and second occurrences of robbed bit signaling and digital loss, to the occurrence tables to determine the type of the first occurrence of robbed bit signaling affecting the upstream PCM channel of the digital communication network for each time interval.

26. The device of claim 25 wherein the logic for comparing includes logic for comparing a pattern of each of the impairment tables to the occurrence tables.

27. The device of claim 26 wherein the logic for comparing further includes logic for determining which impairment tables have null points and logic for comparing the null point patterns of the impairment tables having null points to the occurrence tables and determining if any of the null point patterns match the occurrence tables indicating the type of the first occurrence of robbed bit signaling associated with the matching impairment table is the type of the first occurrence of robbed bit signaling affecting the digital for each time interval.

28. The device of claim 27 wherein the logic for comparing further includes logic for comparing, when no null point patterns match, the probability patterns of the impairment tables not having null points and logic for determining which probability pattern matches the occurrence table indicating the type of the first occurrence of robbed bit signaling associated with the matching impairment table is the type of the first occurrence of robbed bit signaling affecting the digital network for each time interval.

29. The method of claim 17 wherein the plurality of time intervals are robbed bit signaling time intervals.

30. The device of claim 18 wherein the logic for deriving includes logic for eliminating certain types of RBS and digital loss as being possible types affecting the digital communication network when there are received digital values that exceed a predetermined value.

31. In a digital pulse code modulation (PCM) modem interconnected to the digital communication network and adapted to receive data transmission from an analog PCM modem interconnected to an analog channel, a device for estimating the coefficients of the analog channel, the device comprising:

logic for receiving, by the digital PCM modem, a sequence of octets, v(n), from the upstream PCM channel of the digital communication network, which octets are produced from a sequence of levels transmitted by the analog PCM modem over the analog channel and quantized;

logic for determining from the received octets the digital impairments affecting the upstream PCM channel of the digital communication network;

logic for converting the received octets to received linear values, vl(n);

logic for receiving a reference directed sequence of the levels transmitted by the analog PCM modem;

logic for filtering the reference directed sequence with an analog channel filter having analog channel coefficients to produce a filtered reference directed sequence;

logic for quantizing the filtered reference directed sequence to produce a sequence of reference directed octets;

logic for modifying the sequence of reference directed octets according to the determined upstream digital impairments to produce an estimated sequence of octets, v(n)', which is an estimation of the sequence of received octets, v(n);

logic for converting the estimated sequence of octets, v(n)' to estimated linear values, vl(n)';

logic for generating an error signal by taking the difference between the received linear values, vl(n), and the estimated linear values, vl(n)'; and logic for estimating the analog channel coefficients using the error signal and the reference directed sequence of the levels.

32. In a digital pulse code modulation (PCM) modem interconnected to the digital communication network and adapted to receive upstream data transmission from an analog PCM modem interconnected to an analog channel, a device for estimating downstream echo introduced to the upstream data transmission at the input of a quantization device caused by downstream data transmission from the digital PCM modem to the analog PCM modem, the device comprising:

logic for receiving, by the digital PCM modem, a sequence of octets, v(n), from the upstream PCM channel of the digital communication network, which octets are produced from a sequence of levels transmitted by the analog PCM modem over the analog channel and quantized by the quantization device;

logic for determining from the received octets the digital impairments affecting the upstream PCM channel of the digital communication network;

logic for converting the received octets, based on the quantization device and the determined upstream digital impairments, to virtual quantizer points, vq(n);

logic for modifying octets transmitted downstream from the digital PCM modem according to predetermined downstream digital impairments to produce modified downstream octets, p(n);

logic for converting the modified downstream octets to modified downstream linear values, pl(n);

logic for filtering the modified downstream linear values, pl(n), with a downstream echo channel filter having echo channel coefficients to produce a downstream echo estimation;

logic for generating an error signal by taking the difference between the virtual quantizer points, vq(n), and the estimated downstream echo; and logic for updating the echo channel coefficients using the error signal and the modified downstream linear values, pl(n).

33. A computer useable medium having computer readable program code means embodied therein for detecting digital impairments affecting an upstream pulse code modulation (PCM) channel in a digital communication network, comprising:

computer readable program code means for receiving, by a digital PCM modem interconnected to the digital communication network, a random sequence of digital values selected from a constellation of digital values transmitted over the upstream PCM channel of the digital communication network;

computer readable program code means for establishing distributions of the received digital values, each distribution corresponding to one of a plurality of time intervals; and computer readable program code means for deriving from the distributions the types of robbed bit signaling and digital loss affecting the upstream PCM channel of the digital communication network for each time interval.

34. The computer useable medium of claim 33 wherein the computer readable program code means for establishing includes computer readable program code means for establishing occurrence tables for the constellation of digital values from the received random sequence by maintaining a count of the number times each of the digital values in the constellation is received by the digital PCM modem during each time interval.

35. The computer useable medium of claim 34 wherein there is a first occurrence of robbed bit signaling prior to the digital loss and a second occurrence of robbed bit signaling after the digital loss.

36. The computer useable medium of claim 35 wherein the computer readable program code means for deriving includes computer readable program code means for observing the least significant bits of the received digital values in the distributions to determine the type of the second occurrence of robbed bit signaling in each time interval.

37. The computer useable medium of claim 36 wherein the computer readable program code means for deriving further includes computer readable program code means for comparing a plurality of impairment tables, corresponding to different combinations of the first and second occurrences of robbed bit signaling and digital loss, to the occurrence tables to determine the type of digital loss affecting the upstream PCM channel of the digital communication network.

38. The computer useable medium of claim 37 wherein the computer readable program code means for comparing includes computer readable program code means for comparing a pattern of each of the impairment tables to the occurrence tables.

39. The computer useable medium of claim 38 wherein the computer readable program code means for comparing further includes computer readable program code means for determining which impairment tables have null points and computer readable program code means for comparing the null point patterns of the impairment tables having null points to the occurrence tables and determining if any of the null point patterns match the occurrence tables indicating the type of digital loss associated with the matching impairment table is the type of digital loss affecting the digital.

40. The computer useable medium of claim 39 wherein the computer readable program code means for comparing further includes computer readable program code means for comparing, when no null point patterns match, the probability patterns of the impairment tables not having null points and computer readable program code means for determining which probability pattern matches the occurrence table indicating the type of digital loss associated with the matching impairment table is the type of digital loss affecting the digital network.

41. The computer useable medium of claim 40 wherein the computer readable program code means for deriving further includes computer readable program code means for comparing a plurality of impairment tables, corresponding to different combinations of the first and second occurrences of robbed bit signaling and digital loss, to the occurrence tables to determine the type of the first occurrence of robbed bit signaling affecting the upstream PCM channel of the digital communication network for each time interval.

42. The computer useable medium of claim 41 wherein the computer readable program code means for comparing includes computer readable program code means for comparing a pattern of each of the impairment tables to the occurrence tables.

43. The computer useable medium of claim 42 wherein the computer readable program code means for comparing further includes computer readable program code means for determining which impairment tables have null points and comparing the null point patterns of the impairment tables having null points to the occurrence tables and computer readable program code means for determining if any of the null point patterns match the occurrence tables indicating the type of the first occurrence of robbed bit signaling associated with the matching impairment table is the type of the first occurrence of robbed bit signaling affecting the digital for each time interval.

44. The computer useable medium of claim 43 wherein the computer readable program code means for comparing further includes computer readable program code means for comparing, when no null point patterns match, the probability patterns of the impairment tables not having null points and computer readable program code means for determining which probability pattern matches the occurrence table indicating the type of the first occurrence of robbed bit signaling associated with the matching impairment table is the type of the first occurrence of robbed bit signaling affecting the digital network for each time interval.

45. The computer useable medium of claim 33 wherein the plurality of time intervals are robbed bit signaling time intervals.

46. The computer useable medium of claim 34 wherein the computer readable program code means for deriving includes computer readable program code means for eliminating certain types of RBS and digital loss as being possible types affecting the digital communication network when there are received digital values that exceed a predetermined value.

47. A computer useable medium having computer readable program code means embodied therein for estimating the coefficients of the analog channel for use In a digital pulse code modulation (PCM) modem interconnected to the digital communication network and adapted to receive data transmission from an analog PCM modem interconnected to an analog channel, comprising:
  computer readable program code means for receiving, by the digital PCM modem, a sequence of octets, v(n), from the upstream PCM channel of the digital communication network, which octets are produced from a sequence of levels transmitted by the analog PCM modem over the analog channel and quantized;
  computer readable program code means for determining from the received octets the digital impairments affecting the upstream PCM channel of the digital communication network;
  computer readable program code means for converting the received octets to received linear values, vl(n);
  computer readable program code means for receiving a reference directed sequence of the levels transmitted by the analog PCM modem;
  computer readable program code means for filtering the reference directed sequence with an analog channel filter having analog channel coefficients to produce a filtered reference directed sequence;
  computer readable program code means for quantizing the filtered reference directed sequence to produce a sequence of reference directed octets;
  computer readable program code means for modifying the sequence of reference directed octets according to the determined upstream digital impairments to produce an estimated sequence of octets, v(n)', which is an estimation of the sequence of received octets, v(n);
  computer readable program code means for converting the estimated sequence of octets, v(n)' to estimated linear values, vl(n)';
  computer readable program code means for generating an error signal by taking the difference between the received linear values, vl(n), and the estimated linear values, vl(n)'; and
  computer readable program code means for estimating the analog channel coefficients using the error signal and the reference directed sequence of the levels.

48. A computer useable medium having computer readable program code means embodied therein for estimating downstream echo introduced to upstream data transmission at the input of a quantization device caused by downstream data transmission from a digital PCM modem to an analog PCM modem for use in a digital pulse code modulation (PCM) modem interconnected to the digital communication network and adapted to receive upstream data transmission from the analog PCM modem interconnected to an analog channel, the method comprising:
  computer readable program code means for receiving, by the digital PCM modem, a sequence of octets, v(n), from the upstream PCM channel of the digital communication network, which octets are produced from a sequence of levels transmitted by the analog PCM modem over the analog channel and quantized by the quantization device;
  computer readable program code means for determining from the received octets the digital impairments affecting the upstream PCM channel of the digital communication network;
  computer readable program code means for converting the received octets, based on the quantization device and the determined upstream digital impairments, to virtual quantizer points, vq(n);
  computer readable program code means for modifying octets transmitted downstream from the digital PCM modem according to predetermined downstream digital impairments to produce modified downstream octets, p(n);
  computer readable program code means for converting the modified downstream octets to modified downstream linear values, pl(n);
  computer readable program code means for filtering the modified downstream linear values, pl(n), with a downstream echo channel filter having echo channel coefficients to produce a downstream echo estimation;
  computer readable program code means for generating an error signal by taking the difference between the virtual quantizer points, vq(n), and the estimated downstream echo; and
  computer readable program code means for updating the echo channel coefficients using the error signal and the modified downstream linear values, pl(n).

49. A computer data signal embodied in a carrier wave, wherein embodied in the computer data signal are computer readable program code means for detecting digital impairments affecting an upstream pulse code modulation (PCM) channel in a digital communication network, comprising:
  computer readable program code means for receiving, by a digital PCM modem interconnected to the digital communication network, a random sequence of digital values selected from a constellation of digital values transmitted over the upstream PCM channel of the digital communication network;
  computer readable program code means for establishing distributions of the received digital values, each distribution corresponding to one of a plurality of time intervals; and
  computer readable program code means for deriving from the distributions the types of robbed bit signaling and digital loss affecting the upstream PCM channel of the digital communication network for each time interval.

50. The computer data signal of claim 49 wherein the computer readable program code means for establishing includes computer readable program code means for establishing occurrence tables for the constellation of digital values from the received random sequence by maintaining a count of the number times each of the digital values in the constellation is received by the digital PCM modem during each time interval.

51. The computer data signal of claim 50 wherein there is a first occurrence of robbed bit signaling prior to the digital loss and a second occurrence of robbed bit signaling after the digital loss.

52. The computer data signal of claim 51 wherein the computer readable program code means for deriving includes computer readable program code means for observing the least significant bits of the received digital values in the distributions to determine the type of the second occurrence of robbed bit signaling in each time interval.

53. The computer data signal of claim 52 wherein the computer readable program code means for deriving further includes computer readable program code means for comparing a plurality of impairment tables, corresponding to different combinations of the first and second occurrences of robbed bit signaling and digital loss, to the occurrence tables to determine the type of digital loss affecting the upstream PCM channel of the digital communication network.

54. The computer data signal of claim 53 wherein the computer readable program code means for comparing includes computer readable program code means for comparing a pattern of each of the impairment tables to the occurrence tables.

55. The computer data signal of claim 54 wherein the computer readable program code means for comparing further includes computer readable program code means for determining which impairment tables have null points and computer readable program code means for comparing the null point patterns of the impairment tables having null points to the occurrence tables and determining if any of the null point patterns match the occurrence tables indicating the type of digital loss associated with the matching impairment table is the type of digital loss affecting the digital.

56. The computer data signal of claim 55 wherein the computer readable program code means for comparing further includes computer readable program code means for comparing, when no null point patterns match, the probability patterns of the impairment tables not having null points and computer readable program code means for determining which probability pattern matches the occurrence table indicating the type of digital loss associated with the matching impairment table is the type of digital loss affecting the digital network.

57. The computer data signal of claim 56 wherein the computer readable program code means for deriving further includes computer readable program code means for comparing a plurality of impairment tables, corresponding to different combinations of the first and second occurrences of robbed bit signaling and digital loss, to the occurrence tables to determine the type of the first occurrence of robbed bit signaling affecting the upstream PCM channel of the digital communication network for each time interval.

58. The computer data signal of claim 57 wherein the computer readable program code means for comparing includes computer readable program code means for comparing a pattern of each of the impairment tables to the occurrence tables.

59. The computer data signal of claim 58 wherein the computer readable program code means for comparing further includes computer readable program code means for determining which impairment tables have null points and comparing the null point patterns of the impairment tables having null points to the occurrence tables and computer readable program code means for determining if any of the null point patterns match the occurrence tables indicating the type of the first occurrence of robbed bit signaling associated with the matching impairment table is the type of the first occurrence of robbed bit signaling affecting the digital for each time interval.

60. The computer data signal of claim 59 wherein the computer readable program code means for comparing further includes computer readable program code means for comparing, when no null point patterns match, the probability patterns of the impairment tables not having null points and computer readable program code means for determining which probability pattern matches the occurrence table indicating the type of the first occurrence of robbed bit signaling associated with the matching impairment table is the type of the first occurrence of robbed bit signaling affecting the digital network for each time interval.

61. The computer data signal of claim 49 wherein the plurality of time intervals are robbed bit signaling time intervals.

62. The computer data signal of claim 50 wherein the computer readable program code means for deriving includes computer readable program code means for eliminating certain types of RBS and digital loss as being possible types affecting the digital communication network when there are received digital values that exceed a predetermined value.

63. A computer data signal embodied in a carrier wave, wherein embodied in the computer data signal are computer readable program code means for for estimating the coefficients of the analog channel for use In a digital pulse code modulation (PCM) modem interconnected to the digital communication network and adapted to receive data transmission from an analog PCM modem interconnected to an analog channel, comprising:

computer readable program code means for receiving, by the digital PCM modem, a sequence of octets, v(n), from the upstream PCM channel of the digital communication network, which octets are produced from a sequence of levels transmitted by the analog PCM modem over the analog channel and quantized;

computer readable program code means for determining from the received octets the digital impairments affecting the upstream PCM channel of the digital communication network;

computer readable program code means for converting the received octets to received linear values, vl(n);

computer readable program code means for receiving a reference directed sequence of the levels transmitted by the analog PCM modem;

computer readable program code means for filtering the reference directed sequence with an analog channel filter having analog channel coefficients to produce a filtered reference directed sequence;

computer readable program code means for quantizing the filtered reference directed sequence to produce a sequence of reference directed octets;

computer readable program code means for modifying the sequence of reference directed octets according to the determined upstream digital impairments to produce an estimated sequence of octets, v(n)', which is an estimation of the sequence of received octets, v(n);

computer readable program code means for converting the estimated sequence of octets, v(n)' to estimated linear values, vl(n)';

computer readable program code means for generating an error signal by taking the difference between the received linear values, vl(n), and the estimated linear values, vl(n)'; and computer readable program code means for estimating the analog channel coefficients using the error signal and the reference directed sequence of the levels.

64. A computer data signal embodied in a carrier wave, wherein embodied in the computer data signal are computer readable program code means for for estimating downstream echo introduced to upstream data transmission at the input of a quantization device caused by downstream data transmission from a digital PCM modem to an analog PCM modem for use in a digital pulse code modulation (PCM) modem interconnected to the digital communication network and adapted to receive upstream data transmission from the analog PCM modem interconnected to an analog channel, the method comprising:

computer readable program code means for receiving, by the digital PCM modem, a sequence of octets, v(n), from the upstream PCM channel of the digital communication network, which octets are produced from a sequence of levels transmitted by the analog PCM modem over the analog channel and quantized by the quantization device;

computer readable program code means for determining from the received octets the digital impairments affecting the upstream PCM channel of the digital communication network;

computer readable program code means for converting the received octets, based on the quantization device and the determined upstream digital impairments, to virtual quantizer points, vq(n);

computer readable program code means for modifying octets transmitted downstream from the digital PCM modem according to predetermined downstream digital impairments to produce modified downstream octets, p(n);

computer readable program code means for converting the modified downstream octets to modified downstream linear values, pl(n);

computer readable program code means for filtering the modified downstream linear values, pl(n), with a downstream echo channel filter having echo channel coefficients to produce a downstream echo estimation;

computer readable program code means for generating an error signal by taking the difference between the virtual quantizer points, vq(n), and the estimated downstream echo; and computer readable program code means for updating the echo channel coefficients using the error signal and the modified downstream linear values, pl(n).

65. In a digital pulse code modulation (PCM) modem interconnected to the digital communication network and adapted to receive data transmission from an analog PCM modem interconnected to an analog channel, a method for estimating the coefficients of the analog channel and for estimating downstream echo introduced to the upstream data transmission at the input of a quantization device caused by downstream data transmission from the digital PCM modem to the analog PCM modem, comprising:

receiving, by the digital PCM modem, a sequence of octets, v(n), from the upstream PCM channel of the digital communication network, which octets are produced from a sequence of levels transmitted by the analog PCM modem over the analog channel and quantized;

determining from the received octets the digital impairments affecting the upstream PCM channel of the digital communication network;

converting the received octets to received linear values, vl(n);

receiving a reference directed sequence of the levels transmitted by the analog PCM modem;

filtering the reference directed sequence with an analog channel filter having analog channel coefficients to produce a filtered reference directed sequence;

adding to the filtered reference directed sequence an estimated downstream echo;

quantizing the filtered reference directed sequence to produce a sequence of reference directed octets;

modifying the sequence of reference directed octets according to the determined upstream digital impairments to produce an estimated sequence of octets, v(n)', which is an estimation of the sequence of received octets, v(n);

converting the estimated sequence of octets, v(n)' to estimated linear values, vl(n)';

generating an error signal by taking the difference between the received linear values, vl(n), and the estimated linear values, vl(n)'; and estimating the analog channel coefficients using the error signal and the reference directed sequence of the levels;

modifying octets transmitted downstream from the digital PCM modem according to predetermined downstream digital impairments to produce modified downstream octets, p(n);

converting the modified downstream octets to modified downstream linear values, pl(n);

filtering the modified downstream linear values, pl(n), with a downstream echo channel filter having echo channel coefficients to produce an estimated downstream echo; and updating the echo channel coefficients using the error signal and the modified downstream linear values, pl(n).

* * * * *